US011246328B2

(12) United States Patent
Moss et al.

(10) Patent No.: US 11,246,328 B2
(45) Date of Patent: Feb. 15, 2022

(54) SYSTEMS AND METHODS FOR AUTOMATICALLY CORING, OR ISOLATING FIBER OR WHOLE JUICE SACS FROM CITRUS FRUIT

(71) Applicant: The Coca-Cola Company, Atlanta, GA (US)

(72) Inventors: Peter R. Moss, Richmond, TX (US); Simon Gainey, Media, PA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 14/902,538

(22) PCT Filed: Jul. 3, 2014

(86) PCT No.: PCT/US2014/045368
§ 371 (c)(1),
(2) Date: Dec. 31, 2015

(87) PCT Pub. No.: WO2015/003116
PCT Pub. Date: Jan. 8, 2015

(65) Prior Publication Data
US 2016/0374371 A1 Dec. 29, 2016

Related U.S. Application Data

(60) Provisional application No. 61/842,854, filed on Jul. 3, 2013, provisional application No. 61/842,852, filed on Jul. 3, 2013, provisional application No. 61/842,836, filed on Jul. 3, 2013, provisional application No. 61/842,862, filed on Jul. 3, 2013, provisional application No. 61/842,844, filed on Jul. 3, 2013.

(51) Int. Cl.
| *A23L 2/84* | (2006.01) |
| *A23L 2/06* | (2006.01) |
| *A23L 2/08* | (2006.01) |
| *A23L 2/74* | (2006.01) |
| *A23L 19/00* | (2016.01) |

(52) U.S. Cl.
CPC ............... *A23L 2/84* (2013.01); *A23L 2/06* (2013.01); *A23L 2/082* (2013.01); *A23L 2/74* (2013.01); *A23L 19/00* (2016.08); *A23V 2002/00* (2013.01)

(58) Field of Classification Search
CPC ..... A23L 2/06; A23L 2/74; A23L 2/84; A23L 19/00; A23L 2/082
USPC ........................................................ 426/50
See application file for complete search history.

(56) References Cited

U.S. PATENT DOCUMENTS

| 980,371 | A | | 1/1911 | Warner | |
| 2,294,128 | A | * | 8/1942 | Platt | A23L 27/13 |
| | | | | | 426/651 |
| 2,944,576 | A | | 12/1960 | Acosta et al. | |
| 3,945,489 | A | | 3/1976 | Paddock et al. | |
| 4,139,651 | A | * | 2/1979 | Sekiguchi | A23L 5/57 |
| | | | | | 426/442 |
| 4,284,651 | A | * | 8/1981 | Bruemmer | A23L 19/03 |
| | | | | | 426/287 |
| 4,294,861 | A | * | 10/1981 | Ifuku | A23L 2/06 |
| | | | | | 426/475 |
| 4,300,448 | A | | 11/1981 | Hayashi | |
| 4,452,104 | A | | 6/1984 | Altman | |
| 4,729,299 | A | | 3/1988 | Hatch | |
| 4,885,182 | A | | 12/1989 | Kolodesh et al. | |
| 4,977,826 | A | * | 12/1990 | Kock | A23L 2/06 |
| | | | | | 99/516 |
| 5,000,967 | A | | 3/1991 | Adams | |
| 5,120,552 | A | | 6/1992 | Sherman et al. | |
| 5,191,459 | A | | 1/1993 | Camezon et al. | |
| 5,196,222 | A | | 3/1993 | Kirk | |
| 5,200,217 | A | | 4/1993 | Elliot | |
| 5,241,902 | A | | 9/1993 | Gangi | |
| 5,570,629 | A | | 11/1996 | Ruck | |
| 5,787,801 | A | | 8/1998 | Kirk et al. | |
| 5,948,454 | A | | 9/1999 | Virkki et al. | |
| 6,371,014 | B1 | | 4/2002 | Ismail et al. | |
| 6,718,868 | B2 | | 4/2004 | Ismail et al. | |
| 7,629,011 | B2 | | 12/2009 | Suasin et al. | |
| 2004/0043126 | A1 | | 3/2004 | Grewal | |
| 2007/0042096 | A1 | * | 2/2007 | Suasin | A23L 19/03 |
| | | | | | 426/482 |
| 2011/0203351 | A1 | | 8/2011 | Suasin | |
| 2011/0281006 | A1 | * | 11/2011 | Nonaka | A23F 3/163 |
| | | | | | 426/536 |
| 2013/0131012 | A1 | | 5/2013 | Gusek et al. | |

FOREIGN PATENT DOCUMENTS

| CN | 101095554 A | 1/2008 |
| CN | 102488151 A | 6/2012 |
| EP | 0376390 A1 | 7/1990 |

(Continued)

OTHER PUBLICATIONS

NPL Ben-Shalom et al. (in J Food Sci 51(2): pp. 421-423, 1986) (Year: 1986).*
NPL Ben-Shalom Google Scholar Search History (Year: 1986).*
Bates et al. "Principles and Practices of Small- and Medium-scale Fruit Juice Processing". 2001, FAO, Agr. Serv. Bull 146.
"Robotic food processing now with x-ray vision" Sep. 13, 2006. Applied Sorting Technologies Pty Ltd. pp. 1-6. Retrieved from the internet <http://www.foodprocessing.com.au/articles/1133-Robotic-food-processing-now-with-x-ray-vision> on Sep. 28, 2014.

(Continued)

*Primary Examiner* — Bhaskar Mukhopadhyay
(74) *Attorney, Agent, or Firm* — Foley & Lardner LLP

(57) ABSTRACT

A system and method for automatically coring a whole citrus fruit, isolating fiber or substantially whole juice sacs from at least a portion of a whole citrus fruit.

17 Claims, 23 Drawing Sheets

(56) References Cited

FOREIGN PATENT DOCUMENTS

EP            0776614   A2     6/1997

OTHER PUBLICATIONS

International Search Report of PCT/US2014/045368 dated Nov. 13, 2014; 4 pages.
Extended European Search Report corresponding to Europe Application No. 19188463.4, dated Feb. 18, 2020.

* cited by examiner

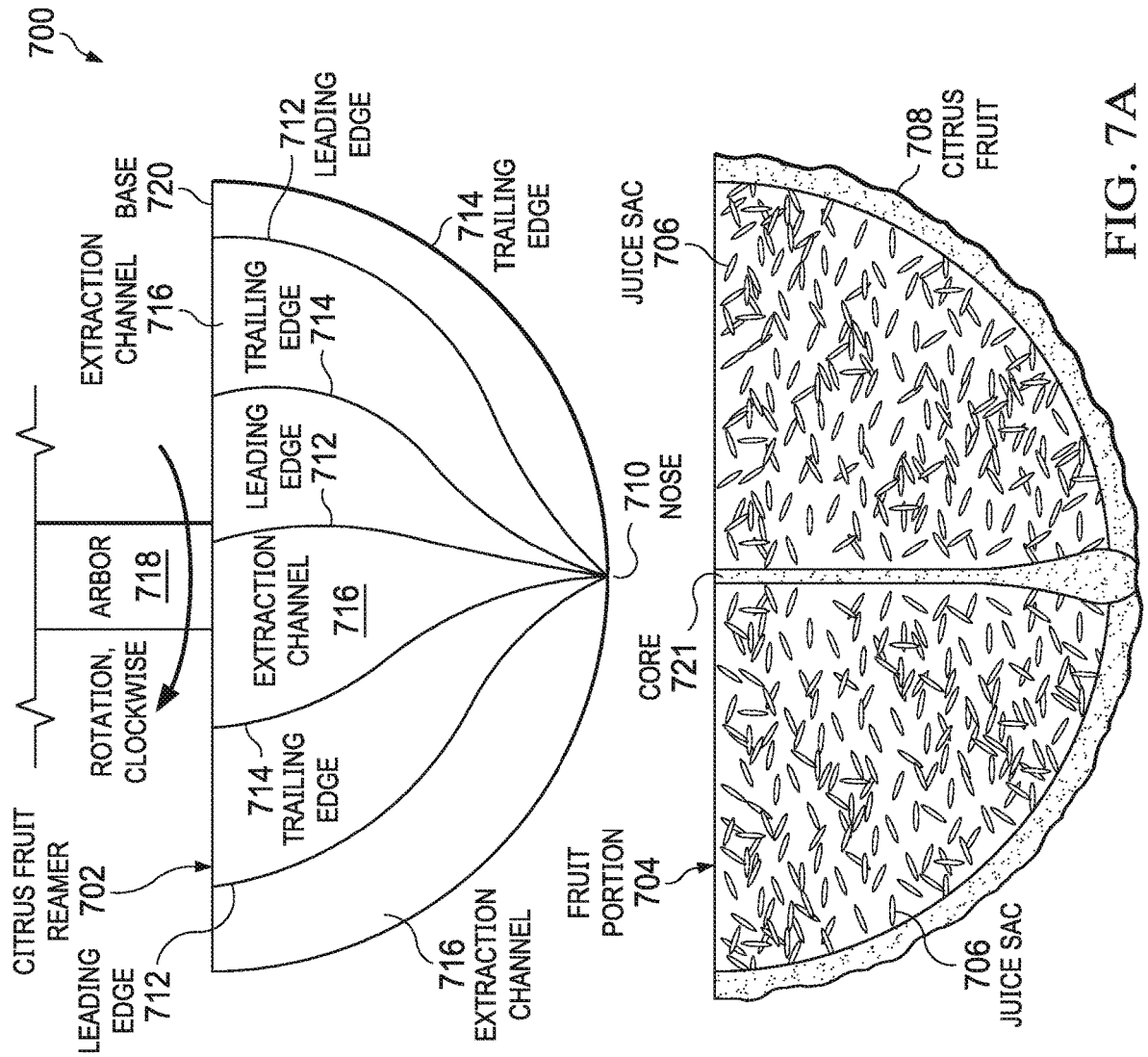

SYSTEMS AND METHODS FOR AUTOMATICALLY CORING, OR ISOLATING FIBER OR WHOLE JUICE SACS FROM CITRUS FRUIT

CROSS-REFERENCE TO RELATED APPLICATIONS

This is the United States National Stage of Patent Cooperation Treaty Application No. PCT/US14/045368 filed in the U.S. Patent and Trademark Office on Jul. 3, 2014. This Application claims the benefit of U.S. Application Nos. 61/842,836; 61/842,844; 61/842,852; 61/842,854; and 61/842,862, all filed Jul. 3, 2013, all of which are incorporated herein by reference in their entirety.

BACKGROUND

Pulp extracted from fruit, such as citrus, has become a very large business for fruit beverage producers. As understood in the art, whole juice sacs from citrus are prized as the taste and mouthfeel of the juice sacs in beverages are preferred by many consumers. Pulp, especially the whole juice sacs portion of the pulp, however, can be difficult to collect to meet consumer taste acceptance. In many parts of the world, collecting pulp, and in particular the whole juice sacs, is a manual and costly process. That is, separation and removal of the whole juice sacs is a labor intensive process. With demand of pulp sharply increasing over recent years, the pulp and whole juice sacs, which have become valuable commodities, need to be more efficiently extracted from the fruit since there is a limited supply of fruit.

SUMMARY

The principles of the present invention address limitations of whole juice sac production by utilizing a number of different techniques. The different techniques may include the use of (i) multiple enzyme treatments to degrade pectin in the citrus combined with automated mechanical processes to isolate whole juice sacs from the citrus fruit, (ii) a combination of an enzyme treatment along with automated mechanical processes to isolate whole juice sacs from the citrus, or (iii) automated mechanical processes to isolate the whole juice sacs from the citrus. The different techniques may result in producing different percentages of whole juice sacs from the citrus fruit. The different automated mechanical processes may use a wide range of techniques and mechanisms to avoid rupturing the juice sacs.

One embodiment of a method of isolating whole juice sacs from at least a portion of a whole citrus fruit may include introducing a first enzyme into the at least a portion of the whole citrus fruit to cause the at least a portion of the whole citrus fruit to partially degrade to produce partially degraded citrus. Peel may be removed from the partially degraded citrus to expose a first degraded citrus. A second enzyme may be applied to the first degraded citrus to cause the first degraded citrus to further degrade to form a second degraded citrus. The whole juice sacs may be isolated from the second degraded citrus.

One embodiment for a system for isolating whole juice sacs from at least a portion of a whole citrus fruit may include a first vessel configured to introduce a first enzyme into the at least a portion of the whole citrus fruit to cause the at least a portion of the whole citrus fruit to partially degrade to produce partially degraded citrus. A peel remover may be configured to remove peel from the partially degraded citrus to expose a first degraded citrus. A second vessel may be configured to apply a second enzyme to the first degraded citrus to cause the first degraded citrus to further degrade to form a second degraded citrus. At least one isolation device may be configured to isolate the whole juice sacs from the second degraded citrus.

One embodiment of a method of isolating substantially whole juice sacs from at least a portion of a whole citrus fruit may include introducing a first enzyme into the at least a portion of the citrus fruit to cause the at least a portion of the whole citrus fruit to partially degrade to produce a partially degraded citrus. Peel may be automatically removed from the partially degraded citrus to expose a first degraded citrus. The whole juice sacs may be isolated from the first degraded citrus.

One embodiment of a system for isolating substantially whole juice sacs from at least a portion of a whole citrus fruit may include a first vessel configured to introduce a first enzyme into the at least a portion of the citrus fruit to cause the at least a portion of the whole citrus fruit to partially degrade to produce a partially degraded citrus. A peel remover may be configured to automatically remove peel from the partially degraded citrus to expose a first degraded citrus. At least one isolation device may be configured to isolate the whole juice sacs from the first degraded citrus.

One embodiment of a method of recovering whole juice sacs from a whole citrus fruit may include automatically reaming a fruit portion of the whole citrus fruit to cause whole juice sacs to be removed from the fruit portion of the whole citrus fruit. A level of whole juice sacs may be above approximately 5 percent of a total number of whole juice sacs in the fruit portion of the whole citrus fruit. The whole juice sacs may be isolated from other parts of the fruit portion of the whole citrus fruit.

One embodiment of a citrus fruit reamer may include a reamer body including a nose, a base, and an external surface. The nose may be positioned on a central axis of the reamer body, the external surface being defined between the nose and the base. Multiple leading edges may be spaced circumferentially about the external surface of the reamer body, where each leading edge extends radially between the nose and the base. Multiple trailing edges may be spaced circumferentially about the external surface of the reamer body and radially inward from the leading edges, where each of the trailing edges may be interposed between a pair of leading edges. Multiple extraction channels may be spaced circumferentially about the external surface of the reamer body, where each extraction channel may extend radially between the nose and the base and between respective leading and trailing edges to enable intact juice sacs of a citrus fruit to be extracted therefrom.

One embodiment of a method of isolating fiber from at least a portion of a whole citrus fruit may include introducing a first enzyme into the citrus to cause the at least a portion of the whole citrus fruit to partially degrade. A first eluate may be collected from the partially degraded citrus, where the first eluate includes fiber. Peel from the partially degraded citrus may be removed to expose first degraded citrus. A second enzyme may be applied to the first degraded citrus to form a second degraded citrus. A second eluate may be collected from the second degraded citrus, where the second eluate includes fiber. The fiber may be isolated from the first and/or second eluates.

One embodiment of a system for isolating fiber from at least a portion of a whole citrus fruit may include a first vessel configured to introduce a first enzyme into the citrus fruit to cause the at least a portion of the whole citrus fruit to partially degrade. A first collection vessel may be configured to collect a first eluate from the partially degraded citrus, where the first eluate includes fiber. A peel remover may be configured to remove peel from the partially degraded citrus to expose first degraded citrus. A second vessel may be configured to apply a second enzyme to the first degraded citrus to form a second degraded citrus. A second collection vessel may be configured to collect a second eluate from the second degraded citrus, where the second eluate includes fiber. A fiber isolator may be configured to isolate the fiber from the first and/or second eluates.

One embodiment of a method for automatically coring a whole citrus fruit may include automatically orienting a whole citrus fruit such that a core of the whole citrus fruit is substantially aligned with a corer of a coring station. The whole citrus fruit may be cored to remove citrus material within the core of the whole citrus fruit.

One embodiment of a system for automatically coring a whole citrus fruit may include an orienting device configured to automatically orient a whole citrus fruit. A coring station may be configured to core the whole citrus fruit to remove citrus material within the core of the whole citrus fruit.

BRIEF DESCRIPTION OF THE FIGURES

Illustrative embodiments of the present invention are described in detail below with reference to the attached drawing figures, which are incorporated by reference herein and wherein:

FIGS. 7A and 7B are illustrations of an illustrative process of reaming a citrus fruit using the reamer of FIG. 6;

DETAILED DESCRIPTION

Figure 1:
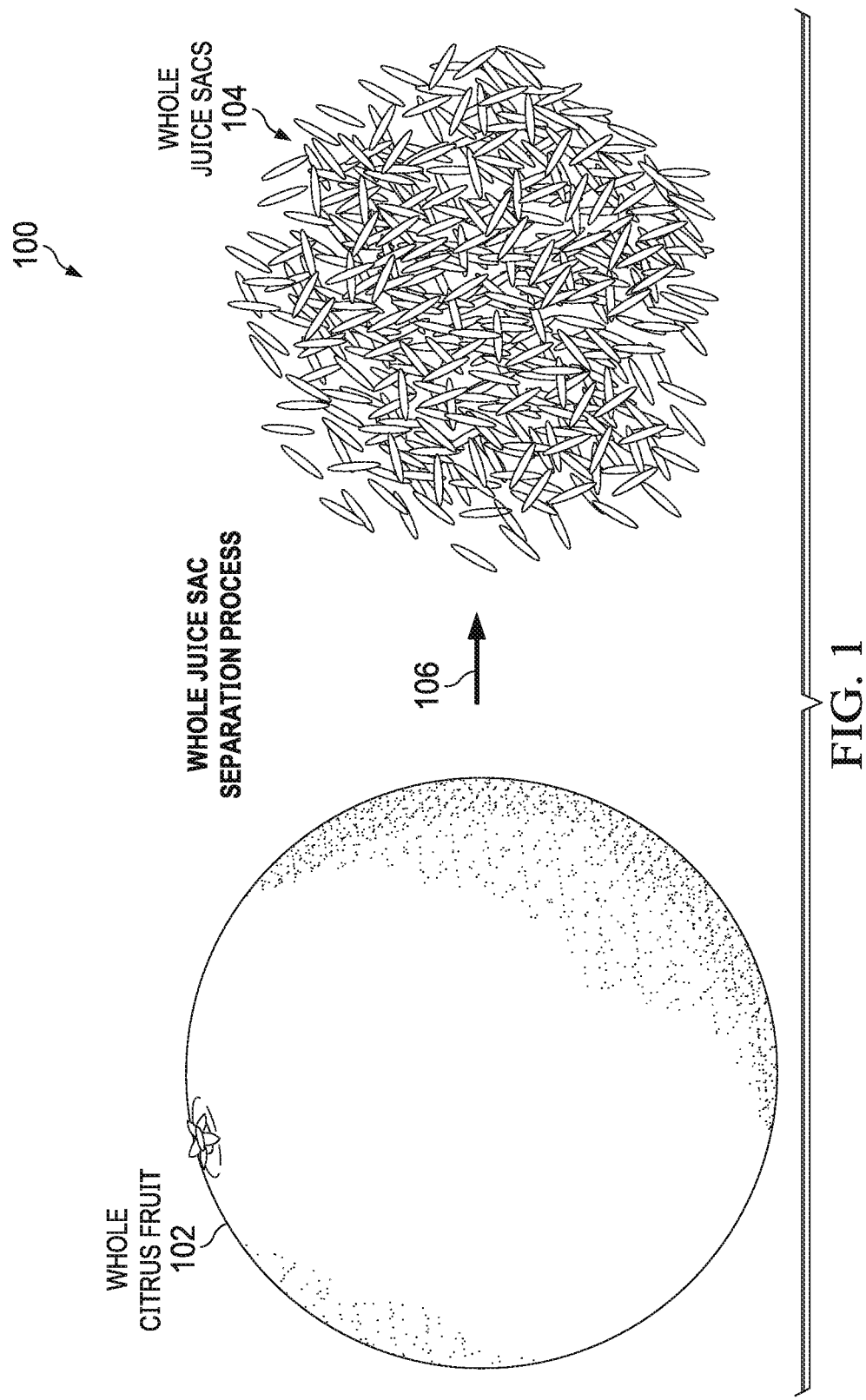
FIG. 1 is an illustration of an illustrative overview of a process that removes and isolates whole juice sacs from a whole citrus fruit.

With regard to FIG. 1, an illustration of an illustrative high level process for processing a whole citrus fruit 102 to produce whole juice sacs 104 contained within the citrus fruit 102 is shown. A process 106 that performs the separation of the whole juice sacs 104 from the whole citrus fruit 102 may have a number of different embodiments that result in higher yields and production volume, as further described herein. By separating the whole juice sacs, also referred to in the art as juice vesicles, 104 using the whole juice sac separation process 106 that provides for higher yields of the whole juice sacs 104 than existing processes, manufacturers of pulp and fruit beverages and foods that include pulp and whole juice sacs as part of the pulp can provide their products with higher quality pulp and at less cost.

By citrus, it is meant, for example, citrus fruit varieties that may include, but are not limited to, any fruit from the Citrus genus, such as oranges, sweet oranges, clementines, kumquats, limes, leeche limes, satsumas, mandarins, tangerines, citrons, pummelos, lemons, rough lemons, grapefruits, tangerines and tangelos, or hybrids thereof. The citrus fruit may be early season, mid-season, or late-season citrus fruit. The pectin content of fruit may vary based on season, where ripe fruit may contain less pectin than unripe fruit.

Figure 2:
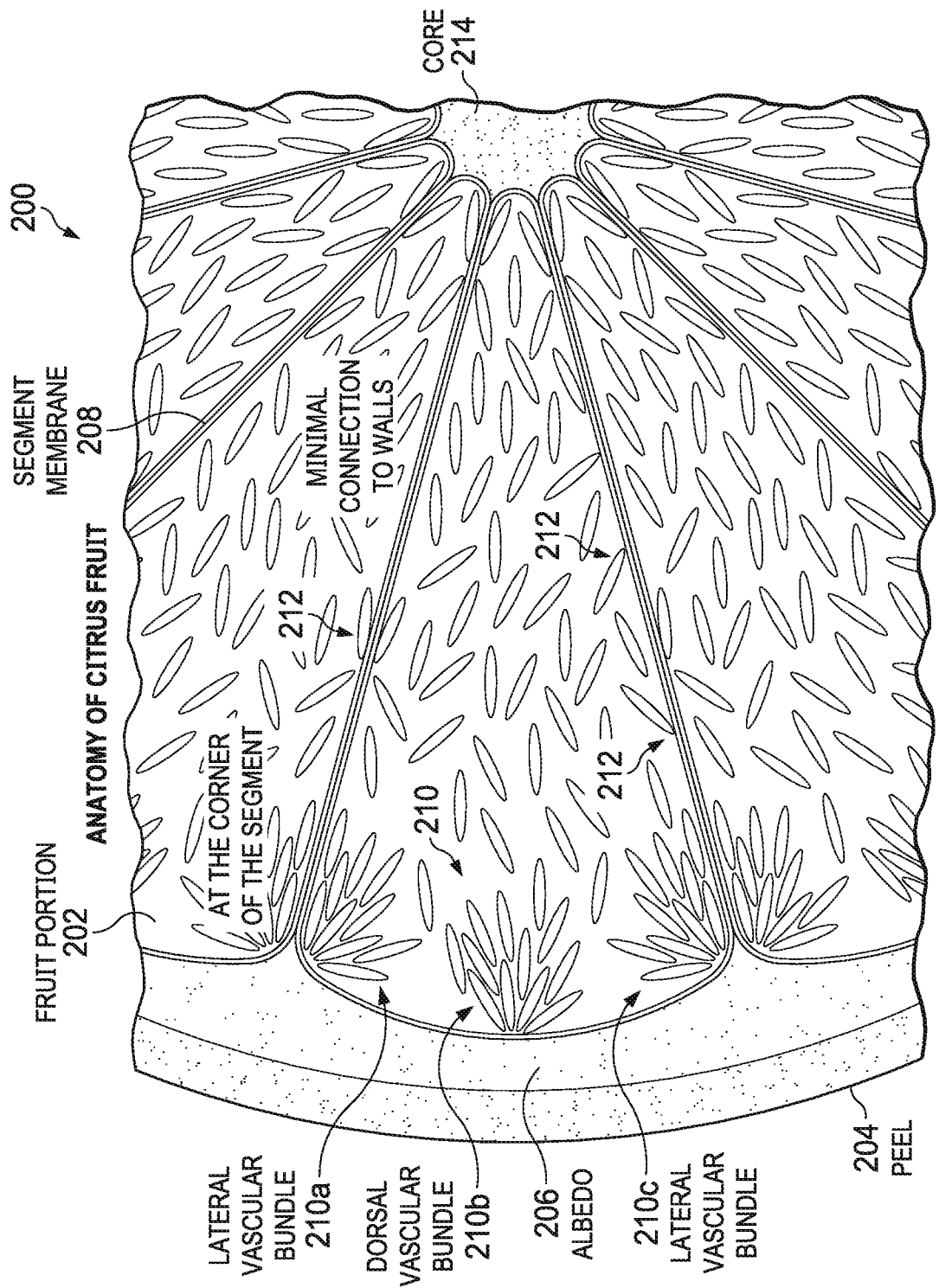
FIG. 2 is an illustration of an anatomical region of a citrus fruit.

With regard to FIG. 2, an illustration of an illustrative portion of citrus fruit 200 is shown with its anatomical components highlighted thereon. The anatomical components may include a fruit portion 202, peel 204, and albedo 206, which separates and connects the peel 204 from and with the fruit portion 202. The fruit portion 202 includes a segment membrane 208 that separates segments of fruit within the citrus fruit 200. Attached to the segment membrane 208 are juice sacs 210 that include a sac member that contains juice of the citrus fruit. As shown, there are multiple vascular bundles attached to the segment membrane 208, including a lateral vascular bundle 210a, dorsal vascular bundle 210b, and another lateral vascular bundle 210c. A few juice sacs 212 may also be attached to the segment membrane 208 closer to a core 214 of the citrus fruit.

Figure 3:
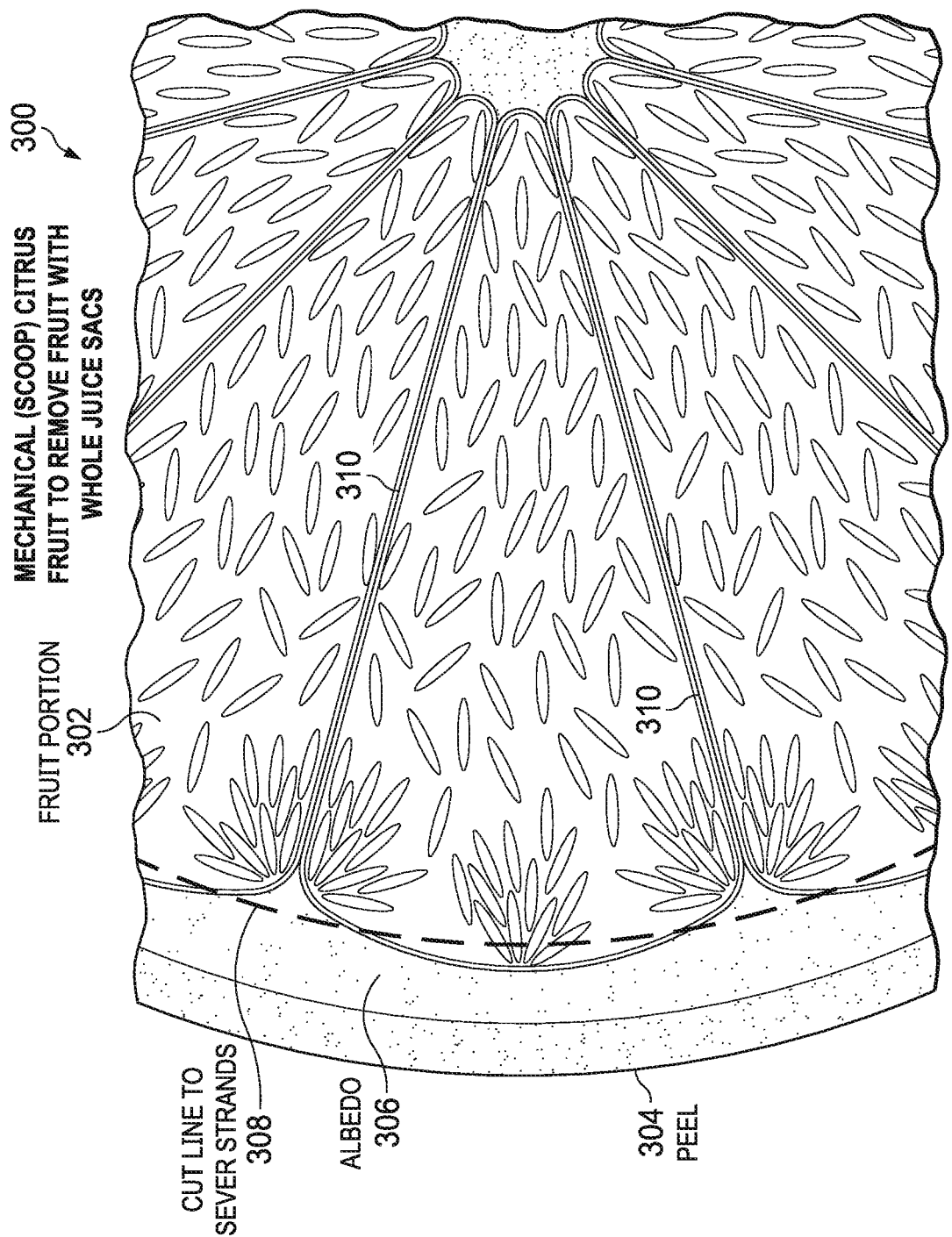
FIG. 3 is an illustration of a portion of a whole citrus fruit showing a cutline for scooping a fruit portion of the whole citrus fruit from the peel of the citrus fruit.

With regard to FIG. 3, an illustration of a citrus fruit 300 includes a fruit portion 302, peel 304, and albedo 306 is shown. In processing the citrus fruit 300, a mechanical scoop or other mechanism (see FIGS. 4 and 5), may be utilized to create a cutline 308 to sever strands or segment membranes 310 of the citrus fruit 300, thereby detaching or separating the fruit portion 302 from the peel 304 and albedo 306. As provided by the anatomy of the citrus fruit 200 shown in FIG. 2, a percentage of the juice sacs contained within the citrus fruit are sufficiently far away from the albedo such that the use of a scoop to remove the fruit portion 302 maintains the juice sacs in a whole or intact state.

Figure 4:
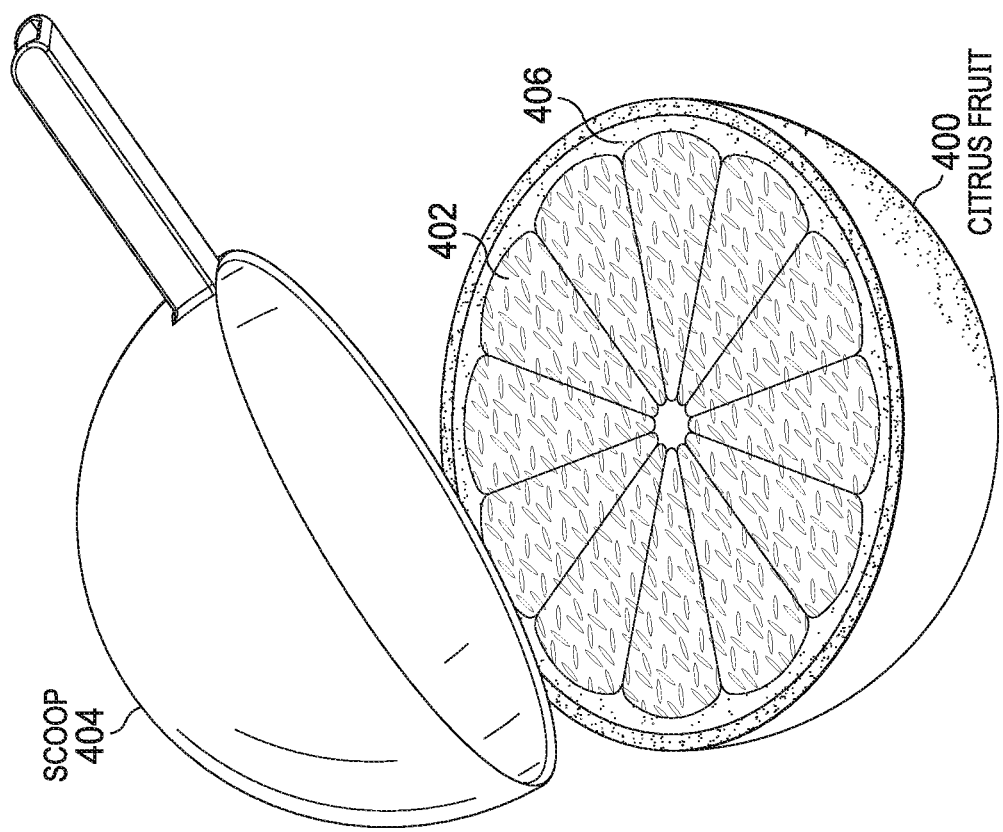
FIG. 4 is an illustration of an illustrative scoop configured to scoop out the fruit portion inclusive of whole juice sacs from the citrus fruit.

With regard to FIG. 4, an illustration of an illustrative portion (i.e., about ½) of a citrus fruit 400 including fruit portion 402 is shown. An illustrative scoop 404 that may be operated by an automated machine that is configured to scoop out the fruit portion 402 of the citrus fruit 400 may be configured as a curved device that may be sized and configured to extend between the fruit portion 402 and albedo 406 to which the fruit portion 402 connects, as further illustrated in FIG. 3.

Figure 5:
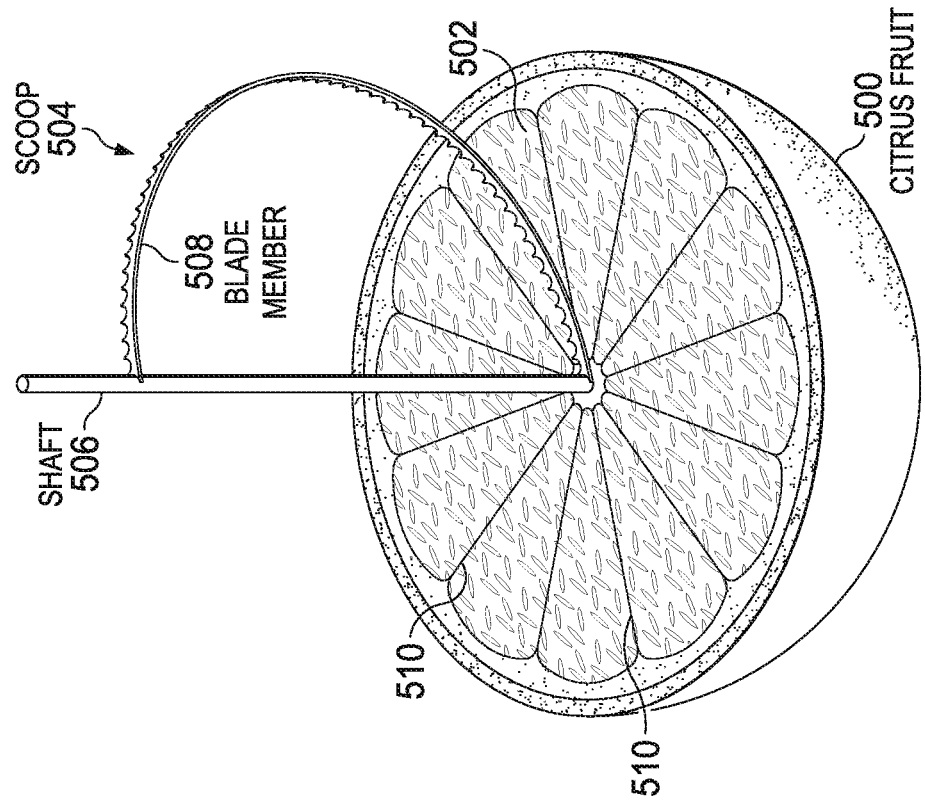
FIG. 5 is an illustration of an alternative scoop configured to cut and/or scoop the fruit portion inclusive of the whole juice sacs of the citrus fruit.

With regard to FIG. 5, an illustration of an illustrative portion of a citrus fruit 500 inclusive of fruit portion 502 is shown. An alternative illustrative scoop 504 may include a linear shaft 506 to which a blade member 508 connects. The blade member 508 is shown to be curved such that the curve of the blade member 508 may have a profile that is similar to or matches an inner profile of the peel of the citrus fruit 500 into which the scoop 504 is being used to cut and extract the fruit portion 502. In operation, the scoop 504 may be extended into the fruit portion 502 and then rotated to enable the blade member 508 to cut the segment membranes 510, thereby separating the fruit portion 502 from the peel and albedo of the citrus fruit 500.

Figure 6:
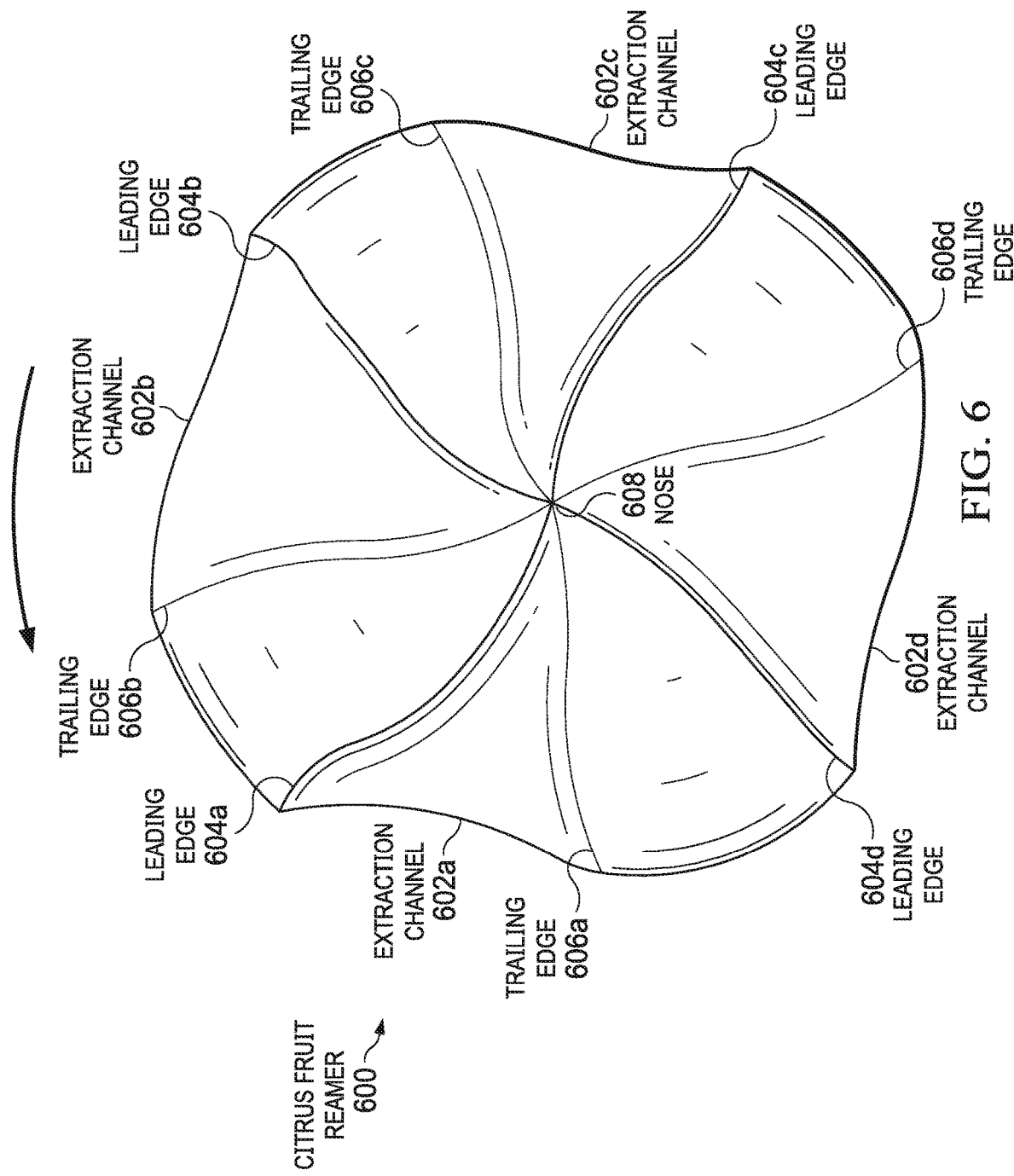
FIG. 6 is an illustration of an illustrative reamer configured to ream a citrus fruit and minimize rupturing whole juice sacs.

With regard to FIG. 6, an illustration of an illustrative "gentle" reamer 600 is shown. The reamer 600 is shown to include multiple extraction channels 602a-602d (collectively 602). Each of the extraction channels 602 include a respective leading edge 604a-604d (collectively 604) and respective trailing edges 606a-606d (collectively 606). In one embodiment, the leading edges 604 extend to an outer perimeter of the reamer 600, whereas the trailing edges 606 may not extend to the perimeter of the reamer 600. Alternatively, both the leading and trailing edges 604 and 606 may extend to the outer perimeter of the reamer. However, by allowing the leading edge to extend radially outward from the trailing edge, the leading edge 604 may contact the fruit portion of the citrus fruit prior to the trailing edge 606. A nose 608 that is centrally positioned at the front of the reamer 600 may be aligned with a center or core of the citrus fruit so that each leading edge 604 operates with symmetrical force as the reamer 600 is drilling or being pushed into the citrus fruit.

In one embodiment, a depth of the extraction channels 602 may grow between the nose 608 and base (720 of FIG. 7) to allow for large amounts of fruit and juice sacs to exit from the reamer 600 as the reamer presses into the fruit. The extraction channels 602 may also be helical in their configuration or have any other shape that reduces or minimizes rupturing juice sacs.

In operation, as the reamer drives or drills into the citrus fruit, the fruit portion inclusive of juice sacs is extracted via the extraction channels 602 for processing and separating the whole juice sacs that, as a result of the design of the reamer 600 may result a high percentage of the juice sacs to remain intact.

With regard to FIG. 7A, an illustration of an illustrative process 700 for using an illustrative citrus fruit reamer 702 for extracting fruit portion 704 inclusive of juice sacs 706 of a citrus fruit 708 is shown. A nose 710 of the reamer 702 is shown to be vertically aligned with a core 712 of the citrus fruit 708 so that the reamer 702 may spin and drill into the fruit portion 704 of the citrus fruit 708 and extract as much of the fruit portion 704 as possible. As with the reamer of FIG. 6, the reamer 702 may include leading edges 712 and trailing edges 714 that define extraction channels 716 that enable the fruit portion 704 to be extracted there through as the reamer 702 is being pressed into the citrus fruit 708 and rotated. An arbor 718 that is connected to a base 720 of the reamer 702 may be attached to a shaft of a machine (not shown) that controls operation and motion of the reamer 702.

Figure 7B:
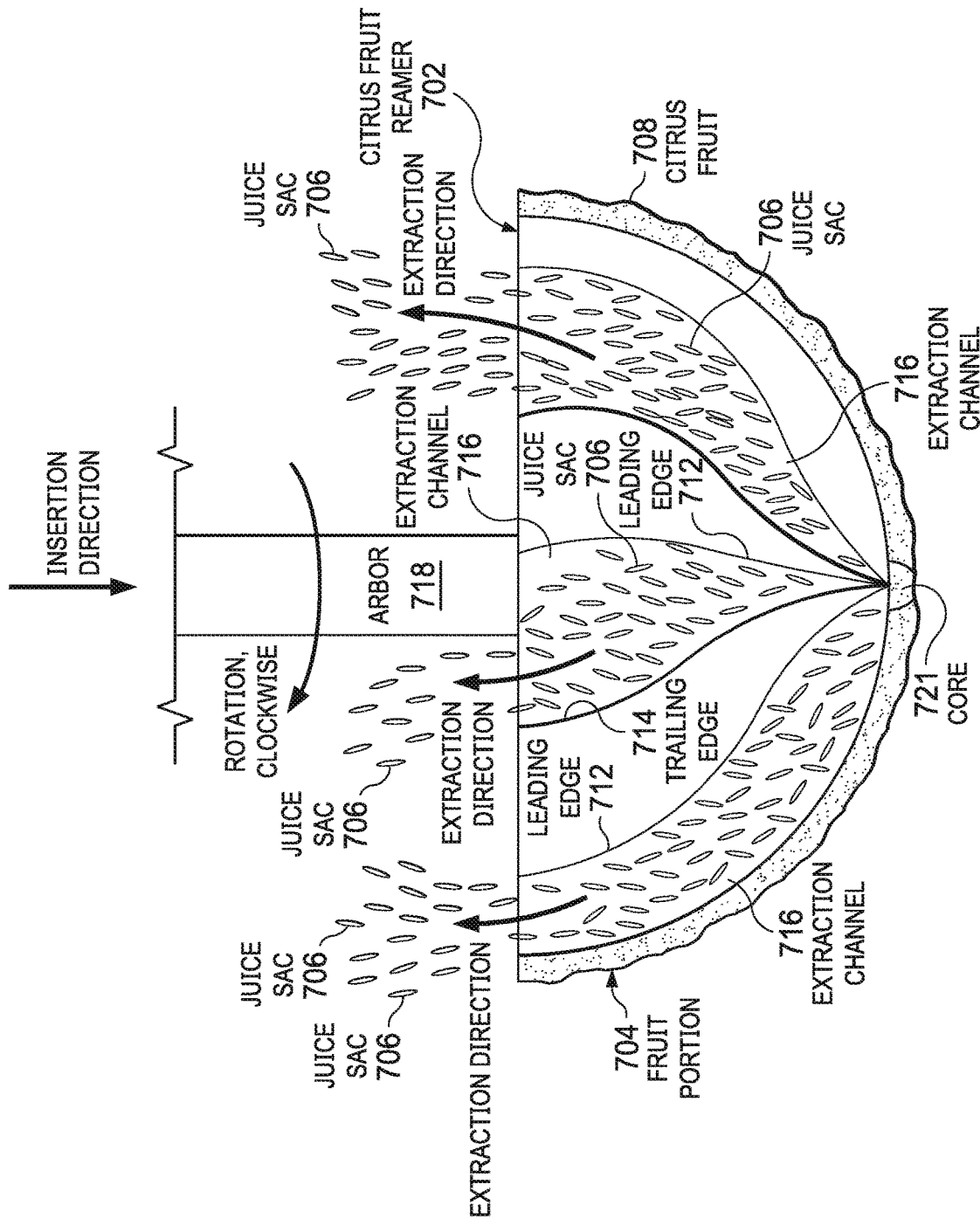

With regard to FIG. 7B, the reamer 702 is shown to be drilled into the citrus fruit 708. As the reamer 702 extends into the citrus fruit 708, the fruit portion 704 of the citrus fruit 708 is shown to be extracting via the extraction channels 716. Because the reamer 702 utilizes a leading edges 712 separated by the extraction channels 716 and trailing edges 714, juice sacs 706 that are part of the fruit portion 704 may remain intact or whole. As previously described, the extraction channels 716 may be configured with varying depth and curvature to limit rupturing of juice sacs. The fruit portion 704 inclusive of the juice sacs 706 may thereafter be processed, either using an enzyme treatment, mechanical treatment, or any other treatment, as understood in the art, to separate the whole juice sacs from the fruit portion 704 of the citrus fruit 708, as further described herein.

The trailing edges 714 may have a sharp (e.g., 90 degree or higher angle) or slightly rounded (e.g., radius less than about 1 mm) edge depending on the type of fruit, size of whole juice sacs, and other factors that are found to preserve a higher percentage of the whole juice sacs. The trailing edges 714 being sharp may cut strands and segment membranes in the citrus, but may also cause the whole juice sacs to rupture more easily than a slightly duller edge. An appropriate sharpness of the trailing edges 714, speed of the reamer 702, speed of insertion of the reamer 702, and other factors based on type of citrus fruit 708, size of whole juice sacs, temperature of citrus fruit, and other parameters may be adjusted to maximize a percentage of whole juice sacs that are produced from the citrus fruit 708.

Figure 8:
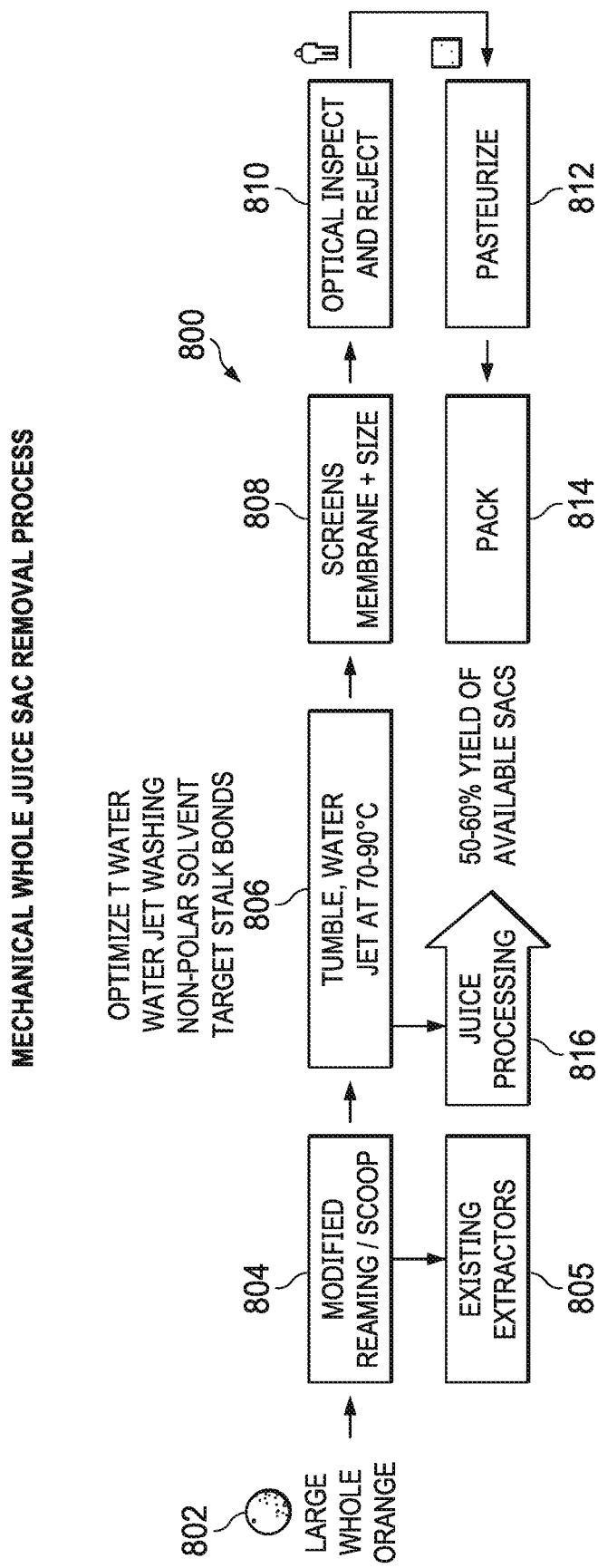
FIG. 8 is a flow diagram of an illustrative mechanical whole juice sac removal process in accordance with the principles of the present invention.

With regard to FIG. 8, an illustrative flow diagram of a mechanical process 800 for removing and separating whole juice sacs from a citrus fruit 802 is shown. The process 800 may include providing the citrus fruit 802, such as an orange. At step 804, a modified reaming or a scooping may be performed. The modified reaming may include use of a "gentle" reamer, such as that shown in FIG. 6, and the scoop may be one as shown in either FIG. 4 or 5, for example. An existing extractor 805 may be used in combination or as an alternative to the modified reaming or scooping at step 804. The modified reaming or scooping at step 804 may result in extracting fruit portion of the citrus fruit 802 that is inclusive of whole juice sacs.

At step 806, a mechanical/hydro processing process may be performed. The mechanical/hydro processing process 806 may include use of a tumbler and water jet that washes the fruit portion. The process 806 may also include the use of optimized T water with a non-polar solvent that targets stalk bonds to separate the whole juice sacs from the remainder of the fruit portion of the citrus fruit 802. At step 808, a screening process that uses screens to help separate the whole juice sacs from the remainder of the fruit portion may be utilized. The whole juice sacs that are collected in the screening process 808 may be optically inspected at step 810 by a human or machine and any whole juice sacs that are accepted may be pasteurized at step 812 and packed at step 814, as understood in the art. Any juice that is produced from the steps 804 and 806 may be processed at step 816. The whole juice sacs resulting from the process 800 is generally between approximately 50% and approximately 60% of the available juice sacs from the citrus fruit 802.

Figure 9:
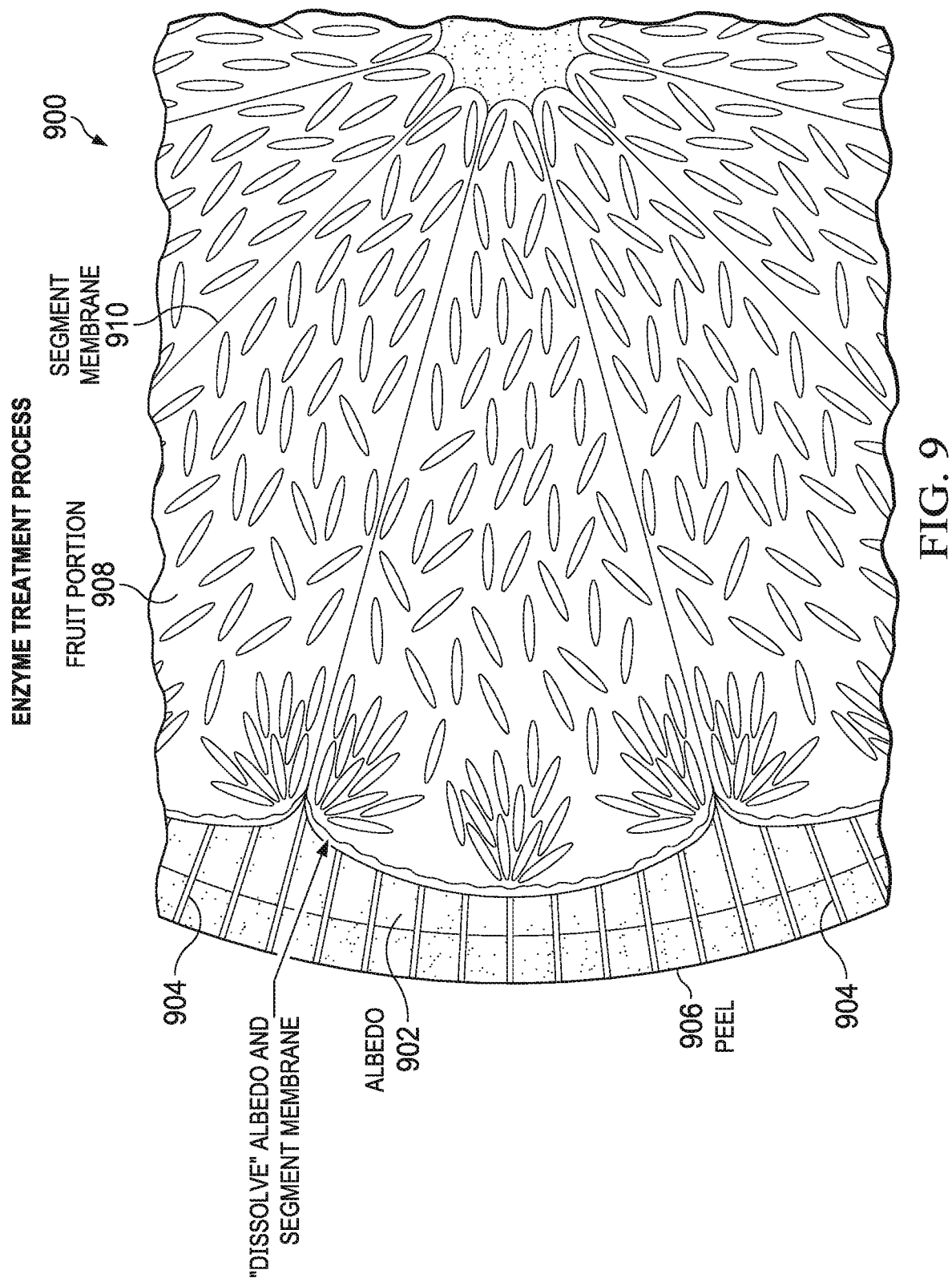
FIG. 9 is an illustration of a citrus fruit with illustrative pricks through a peel of the citrus fruit to enable an enzyme to access albedo and segment membrane via the pricks in the peel to degrade the albedo and segment membrane.

With regard to FIG. 9, an illustration of an illustrative portion of a whole citrus fruit 900 is shown. Although mechanical processes for separating juice sacs from a fruit portion of the citrus fruit 900 may be utilized, to provide additional efficiencies and yield of the whole juice sacs from the citrus fruit 900, the introduction of one or more enzyme treatments or other processes to the whole citrus fruit 900 may be utilized to degrade pectin in the citrus fruit 900. Enzymes, such as pectinase enzymes, which are food safe for humans, may be injected or otherwise delivered into the albedo 902 via holes 904 that may be punctured into peel 906 of the citrus fruit 900. Alternative food safe enzymes may be utilized, as well. The enzymes being injected or otherwise delivered (e.g., use of vacuum pressure to drive the enzymes through the holes 904) through the peel 906 to the albedo 902 via the holes 904 may digest the pectin in the albedo 902, thereby causing connections of the albedo 902 with the peel 906 and fruit portion 908 via segment walls or membranes 910 to be degraded and released or severed. The holes 904 may be "pricks" or larger that may be formed in a variety of ways, as understood in the art. As a result of the use of the enzyme, peeling the peel 906 from the fruit portion 910 may be significantly easier and separation or isolation of the whole juice sacs that might otherwise be ruptured by either scooping or "gentle" reaming the citrus fruit may be facilitated. Moreover, recovery of the juice sacs themselves are increased as a result of the processes described herein.

Figure 10:
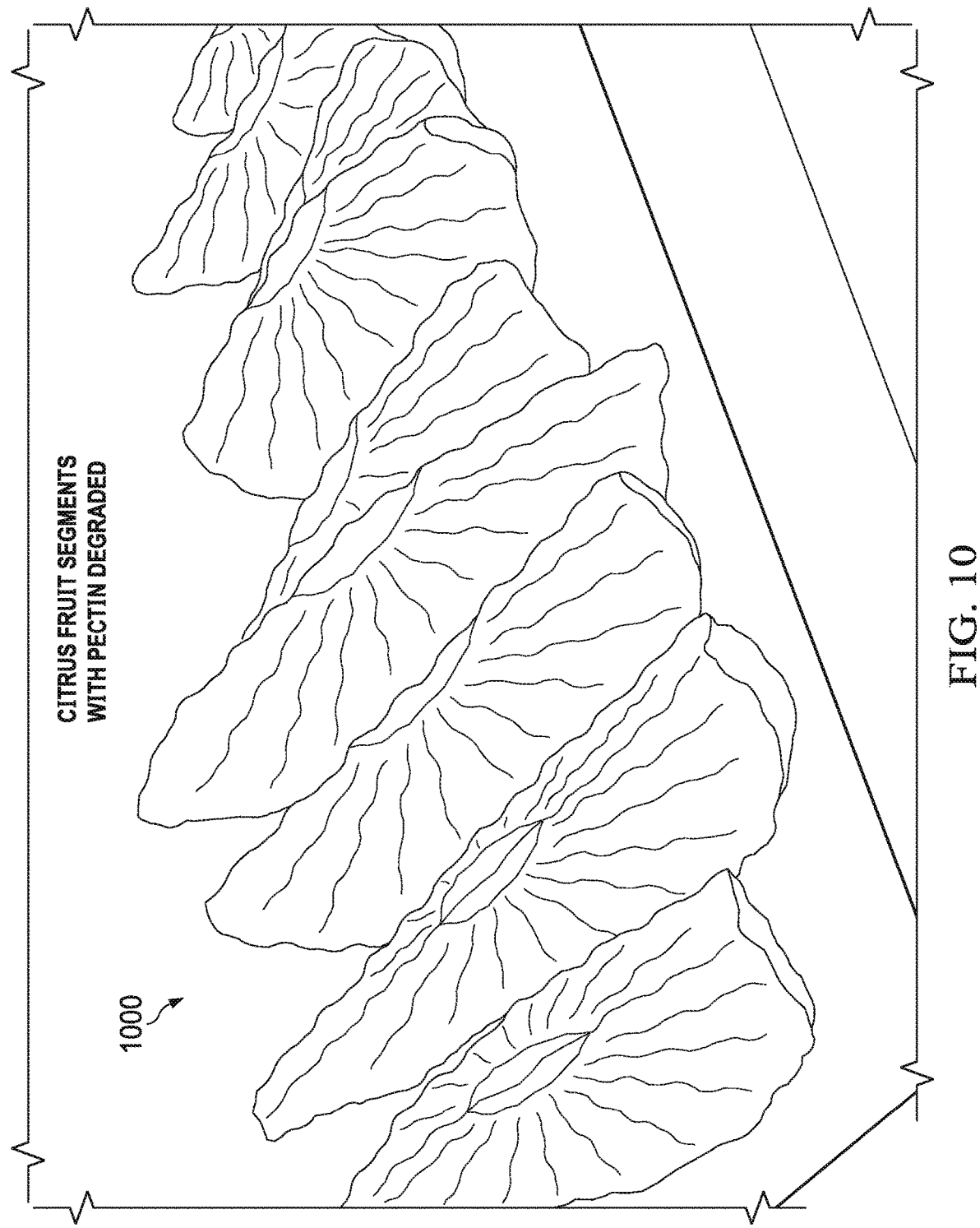
FIG. 10 is an illustration of citrus fruit segments after pectin has been degraded through use of an enzymatic treatment process.

With regard to FIG. 10, an illustration of citrus fruit segments 1000 after pectin has been degraded therefrom is shown. The pectin may have been degraded through use of enzymes or other available treatments, such as thermal, chemical, oxidative, and treatment with microorganisms (fungi, bacteria, etc.), as understood in the art. The citrus fruit segments 1000 without the pectin that operates to laterally support the segments 1000 within the citrus fruit may thereafter be processed using mechanical and/or additional biological processes, such as additional enzyme treatment(s) to further remove pectin from the segments 1000 so that the whole juice sacs may be separated therefrom more easily.

Figure 11:
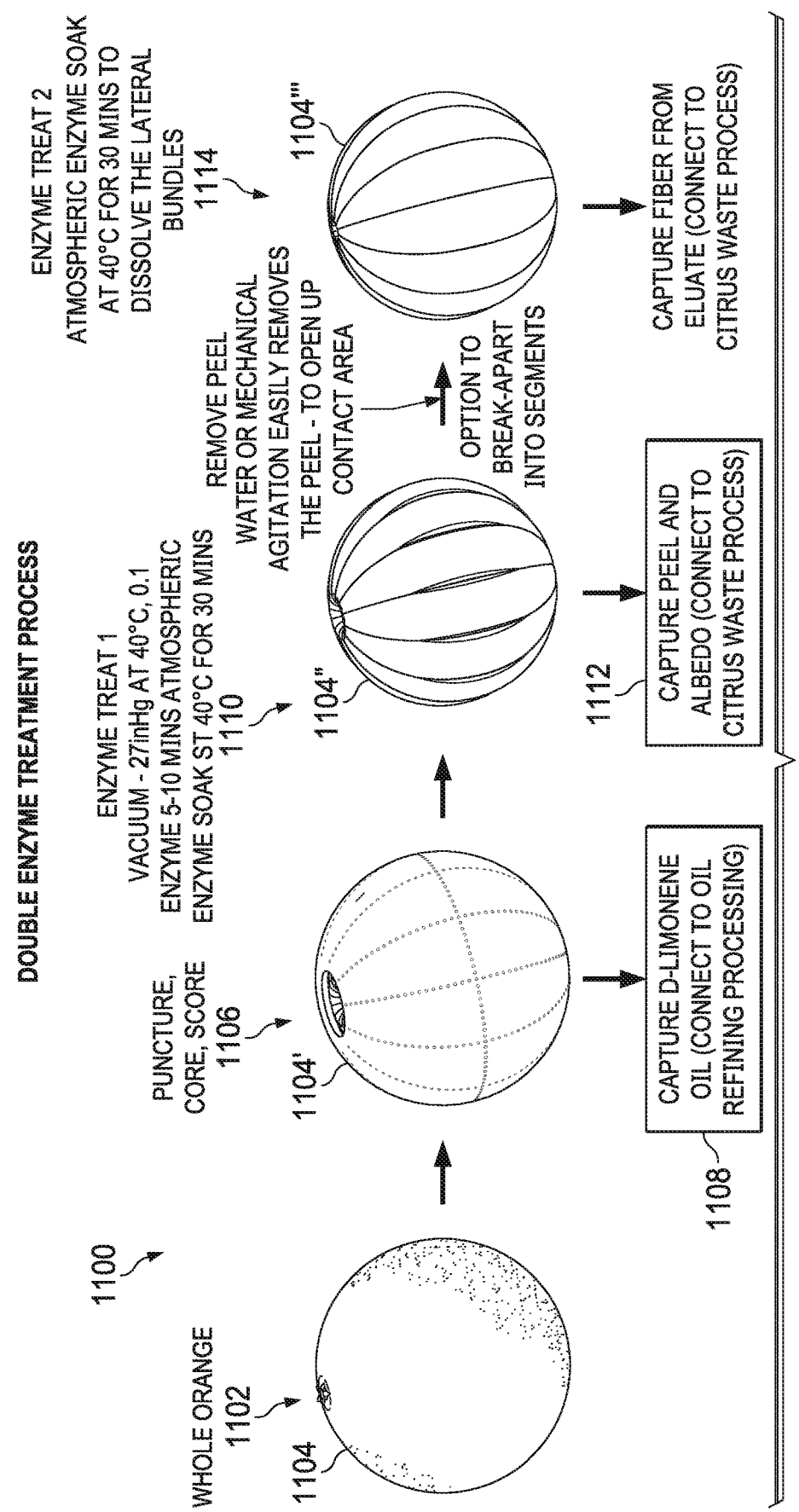
FIG. 11 is an illustration of a double enzymatic treatment process for use in separating whole juice sacs from the citrus fruit and generating byproducts, such as (i) D-limonene oil for use in oil refining processing and (ii) fibrous material for use in extracting citrus fiber for use in manufacturing paper and/or cardboard products.

With regard to FIG. 11, an illustration of an illustrative double enzyme treatment process 1100 is shown. The process 1100 may start at step 1102, where a citrus fruit 1104, such as a whole orange, may be provided. At step 1106, the citrus fruit 1104 may be pretreated prior to performing an enzyme treatment by puncturing, coring, and scoring, or any combination thereof to produce citrus fruit 1104'. Puncturing may include "pricking" the peel of the citrus fruit 1104 to enable an enzyme solution to enter the peel to digest the albedo of the citrus fruit 1104. The pricks may be formed by a bed of needles having a certain length which the fruit is rolled over and onto and optionally pressed, a wheel having needles radially extending therefrom that rotates to apply the pricks into the peel of the fruit, a multi-piece mold having needles extending radially inward that, when the mold closes around a fruit, causes punctures to the peel of the fruit, or otherwise. In one embodiment, the pricks may be spaced less than ⅛ inch across the entire surface of the peel of the citrus fruit 1104. Higher or lower density punctures of the peel may alternatively be applied to the citrus fruit 1104. Coring may include drilling or otherwise penetrating and removing citrus material within a core of the citrus fruit 1104 that does not include or minimally includes juice sacs of the citrus fruit 1104. By coring the citrus fruit 1104, the enzyme solution may perform a deeper penetration, thereby digesting or otherwise degrading pectin within the citrus fruit 1104. In one embodiment, the coring may be performed automatically, as further described herein. Scoring may include slicing or cutting the peel surface of the citrus fruit 1104. In one embodiment, the scoring of the peel surface of the citrus fruit 1104 may include scoring the surface of the peel in both the longitude and latitude directions. Alternatively, one of the two directions may be scored. It should be understood that alternative scoring processes and techniques may be utilized in accordance with the principles of the present invention.

As part of the puncturing process of step 1106, a byproduct of D-limonene oil may be collected from the peel of the citrus fruit 1104 at step 1108. As understood in the art, D-limonene oil may be used for oil refining processing, and has value as a byproduct of processing citrus fruit.

At step 1110, a first enzyme treatment may be applied to the citrus fruit 1104'. The enzyme treatment may include applying a vacuum at a certain temperature in a certain enzymatic solution, such as a pectinase solution, for a certain period of time. In one embodiment, the vacuum may be approximately −27 inHg at a temperature of 40 degrees Celsius. An enzymatic solution in which the citrus fruit 1104' may be immersed may have a 0.1 enzyme concentration and remain in the enzyme solution between approximately five and approximately 10 minutes. Concentration of enzyme and incubation conditions can be adjusted as is known in the art. Using a reduced atmospheric vacuum pressure causes air to be removed from the citrus fruit 1104' and also drive the enzyme solution into the peel of the citrus fruit 1104' so as to contact the albedo in segment membranes of the fruit portion of the citrus fruit 1104'. After the initial vacuum assisted enzyme treatment, an enzyme incubation may be performed. In one embodiment, the incubation occurs at an atmospheric pressure at a temperature of 40 degrees Celsius for 30 minutes may be performed, although incubation temperatures of from 10-50 degrees Celsius, alternatively 15-45 degrees Celsius, alternatively 15-45 degrees Celsius, alternatively 25-37 degrees Celsius and the like may be used. In some embodiments, the incubation temperature may be 30, 31, 32, 33, 34, 35, 36, 37, 38, 39 or 40 degrees Celsius. In some embodiments the incubation may be performed for from 2-60 minutes, from 5-50 minutes, from 10-40 minutes or at least 10, 15, 20, 30, 40 or 50 minutes. Alternatively, the incubation may be performed for 5, 10, 15, 20, 25, 30, 40, 50 or 60 minutes. This additional enzyme treatment at step 1110 may further help cause the pectin within the citrus fruit 1104' to degrade, thereby easing removal of the citrus peel and albedo. The removed peel and albedo may be used as citrus waste for collecting and processing fibers from the peel and albedo for use in manufacturing alternative products, such as paper and cardboard at step 1112.

In removing the peel, water and/or mechanical agitation may easily remove the peel to open up contact areas for further processing. A resulting citrus fruit 1104" that has its peel and albedo removed after the enzymatic treatment is shown.

In one embodiment, the citrus fruit 1104' may continue to be processed without separating the segments of the citrus fruit 1104". Alternatively, the segments of the citrus fruit 1104" may be separated prior to performing a second enzymatic treatment at step 1114.

The first enzymatic treatment 1110 may be tailored with a specific enzyme "mix" for treating all or different types of citrus fruit. That is, the same or different enzyme treatments and solutions may be used to treat oranges, lemons, tangerines, etc. Moreover, it should be understood that alternative temperatures and pressures may be utilized in accordance with the principles of the present invention. For example, certain enzymes may operate at different optimum temperatures and pH levels. Neutral conditions at a temperature of between approximately 40 degrees Celsius and approximately 50 degrees Celsius may be utilized. However, the temperatures and pressures may be varied based on a number of factors, including type of citrus fruit, type of enzyme, concentrations of enzymes, and so forth. As the enzymes being utilized to treat the citrus fruit may be consumed as a result of digesting the pectin in the citrus fruit, enzyme concentrations may be replaced or regulated, either continuously, periodically, or event triggered (e.g., dropping below a threshold level), such that a certain percentage of enzyme levels may be approximately maintained. Such enzyme level maintenance may be measured and/or regulated on an automatic basis. Alternatively, manual measuring and adjustments of the enzyme levels may be performed. Moreover, during the enzyme treatment, sodium bicarbonate or other chemical treatment may be utilized to remove citrus oil from the enzyme solution. After the peeling of the citrus fruit 1104", the remaining citrus fruit 1104" may be washed to assist in further removal of fibrous material of the citrus fruit.

At step 1114, the citrus fruit 1104" may further be soaked in an enzymatic solution under appropriate conditions, such as, for example, in an atmospheric pressure condition at approximately 40 degrees Celsius for approximately 40 minutes to dissolve lateral bundles of fibrous material, such as segment walls in the citrus fruit. Resulting from such a second enzymatic treatment at step 1114 is citrus fruit 1104'''. The enzymatic treatment at step 1114 may vary in treatment conditions, such as using different pressures, different temperatures, different enzymes, different enzyme concentrations, and so forth, in accordance with the principles of the present invention. The citrus fruit 1104''' may thereafter be mechanically and/or hydraulically treated, such as using a warm spray of water on a screen or other mechanical process, to apply a force to the citrus fruit 1104''' to cause separation or isolation of the whole juice sacs from the remainder of the citrus fruit 1104'''. A heater (not shown) may be utilized to increase and regulate temperature of the water or air, as understood in the art. In one embodiment, the temperature of the water or air may be between about 70° C. and about 90° C. If sprayed, the principles of the present invention may pulse the water or air. Continuous streams of water or air may alternatively be utilized to apply force to the citrus fruit 1104''' to separate or isolate the whole juice sacs from the remainder of the citrus fruit 1104'''. The resulting whole juice sacs may be included within a beverage and packaged in a consumer package, as understood in the art. As understood, the consumer package may be any type of consumer package, including cardboard, metal, plastic, etc., and be of any configuration and size, as understood in the art.

As part of the second enzyme treatment at step 1114 is an eluate that includes fiber. This eluate or solution with fiber contained therein is a byproduct and may be collected along with the peel, albedo, and eluate from the first enzyme treatment at step 1110 for use in further processing to produce paper and cardboard products.

Figure 12:
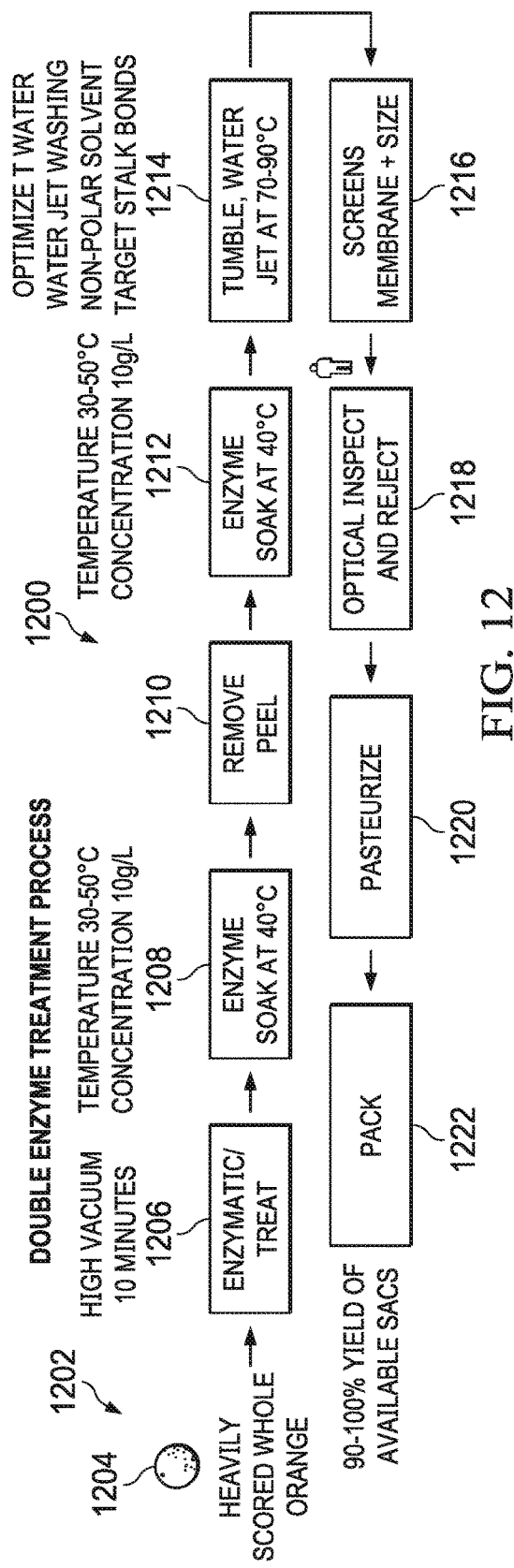
FIG. 12 is a flow diagram of an illustrative double enzyme treatment process for separating whole juice sacs from citrus fruit.

With regard to FIG. 12, a flow diagram of an illustrative double enzyme treatment process 1200 is shown. The process 1200 may start at step 1202, where a heavily scored whole citrus fruit 1204, such as an orange, is provided. The whole citrus fruit 1204 may additionally be punctured and scored, as previously described with regard to FIG. 11.

At step 1206, a first enzyme treatment may be performed. As previously described, the enzyme treatment may include the use of vacuum pressure for a certain period of time, such as about 10 minutes, and at a pressure of less than about −27 inHg with a threshold concentration of about 0.1 percent of enzyme. The enzyme may be pectinase. At step 1208, the first enzyme treatment process may continue, where the temperature may be set between about 30 degrees Celsius and about 50 degrees Celsius, with a concentration of enzymes about 10 g/L, and for a duration of about 30 minutes. Alternative soaking parameters for the enzyme treatment at steps 1206 and 1208 may be utilized in accordance with the principles of the present invention.

After the enzyme soaking process at step 1208, the process 1200 may continue at step 1210, where the peel of the enzyme treated citrus fruit 1204 may be removed. The removal of the peel may be performed automatically at an automatic peeling station. In one embodiment, a machine may apply friction to the peel to cause the peel to be separated from the enzyme treated citrus fruit 1204. Because the peel will be relatively loose due to the enzyme having digested pectin connecting the peel with the strands connecting the fruit portion of the citrus fruit, in addition to the peel having been scored, a variety of different mechanical peeling processes may be utilized in accordance with the principles of the present invention.

At step 1212, a second enzyme soaking process may be performed on the peel-less citrus fruit. The second enzyme soaking process may be at a temperature of between 30 degrees Celsius and about 50 degrees Celsius (e.g., 40 degrees Celsius), with a concentration of 10 g/L, and at atmospheric pressure.

At step 1214, the process 1200 may continue by performing a tumbling with the remaining citrus fruit that has had its pectin substantially degraded or digested by the second enzymatic treatment process at step 1212. The tumbling may include use of a water jet at temperature of between about 70 degrees Celsius and about 90 degrees Celsius. The water may be optimized T water inclusive of a non-polar solvent that targets stalk bonds to separate the whole juice sacs from the stalk bonds. As part of or after the tumbling of step 1214, screens inclusive of a membrane having a certain screen size may be utilized to separate the whole juice sacs from other remaining substances of the citrus fruit.

At step 1218, an optical inspection may be performed to accept and reject whole juice sacs that are being isolated and separated from the citrus fruit 1204. In one embodiment, the inspection may be performed by a human. Alternatively a robotic system may be utilized in visually inspecting and removing non-juice sacs. At step 1220, the whole juice sacs that have been isolated, along with any non-juice sacs that may be desired, such as pulp, may be pasteurized, as understood in the art, and packed at step 1222 for shipping to or later use at a juice and/or food packaging facility. Using the process 1200 as described herein, between about 90% and about 100% yield of available juice sacs may be recovered from the whole citrus fruit 1204.

Figure 13:
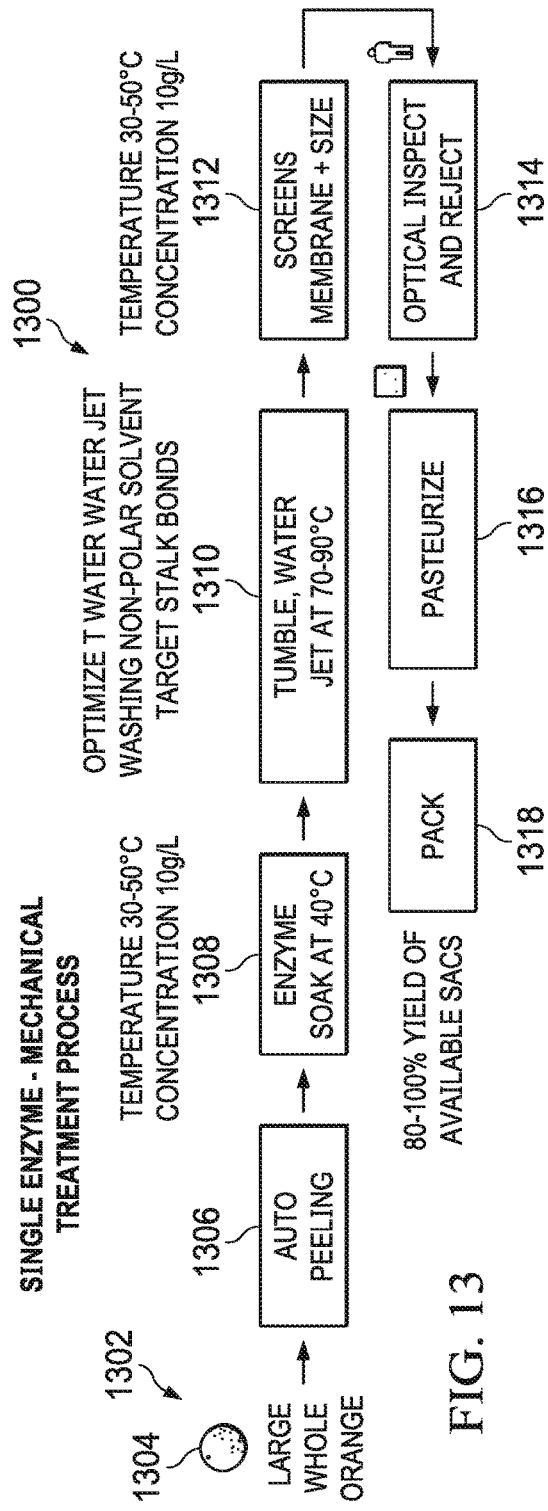
FIG. 13 is a flow diagram of an illustrative single enzyme-mechanical treatment process for use in separating whole juice sacs from citrus fruit.

With regard to FIG. 13, a flow diagram of an illustrative single enzyme, mechanical treatment process 1300 is shown. The process 1300 may start at step 1302 by providing a whole citrus fruit 1304, such as an orange. At step 1306, an automatic peeling process may be performed. The automatic peeling process may utilize an automatic peeler to remove the peel from the citrus fruit. Such an automatic peeling process may rupture some of the whole juice sacs at or near the peel or outside circumference of the citrus fruit, but the level of juice sacs ruptured is acceptable given efficiency resulting from the automated process. At step 1308, an enzymatic treatment process may be performed by soaking the peel-less citrus fruit in an enzyme solution having a concentration 10 g/L at a temperature between about 30 degrees Celsius and about 50 degrees Celsius (e.g., 40 degrees Celsius). The enzymatic treatment process may be performed at atmospheric pressures.

At step 1310, the enzyme treated citrus fruit may be mechanically tumbled using a water jet, as previously described with regard to step 1214 of FIG. 12. At step 1312, whole juice sacs may be screened, as previously described with regard to step 1216 of FIG. 12.

Steps 1314, 1316 and 1318 may be performed in the same or similar manner as steps 1218, 1220, and 1222, as previously described with regard to FIG. 12. As a result of performing the treatment process 1300, a yield of available whole juice sacs between about 80% and about 100% may be recovered from the citrus fruit 1304. Although described as a two step enzymatic treatment process, it should be understood that the principles of the present invention may provide for three or more enzymatic treatment processes, as well.

Figure 14:
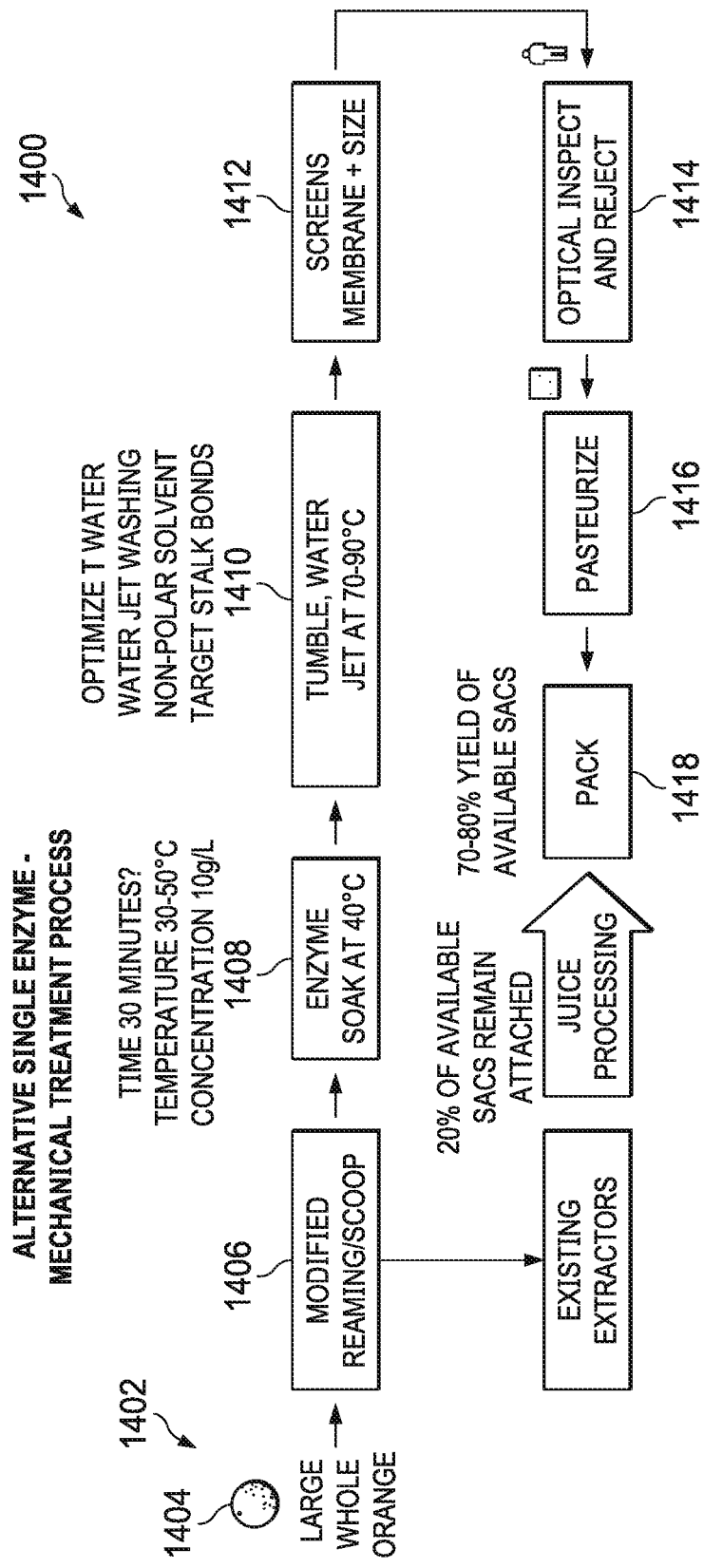
FIG. 14 is a flow diagram of an illustrative alternative single enzyme-mechanical treatment process for use in separating whole juice sacs from citrus fruit.

With regard to FIG. 14, a flow diagram of an illustrative process 1400 representing an alternative single enzyme, mechanical treatment process is shown. The process 1400 may start at step 1402, where a whole citrus fruit 1404 may be provided. At step 1406, a modified reaming or scooping process may be performed on the citrus fruit 1404. The modified reaming and scooping processes may utilize those processes as described with regard to FIGS. 3-8. At step 1408, an enzyme treatment as described in step 1308 in FIG. 3 may be performed. Similarly, steps 1412-1418 may be performed in the same analogous manner as steps 1312-1318, respectively. The results of the process 1400 may yield between about 70% and about 80% of available juice sacs from the citrus fruit 1404.

Figure 15:
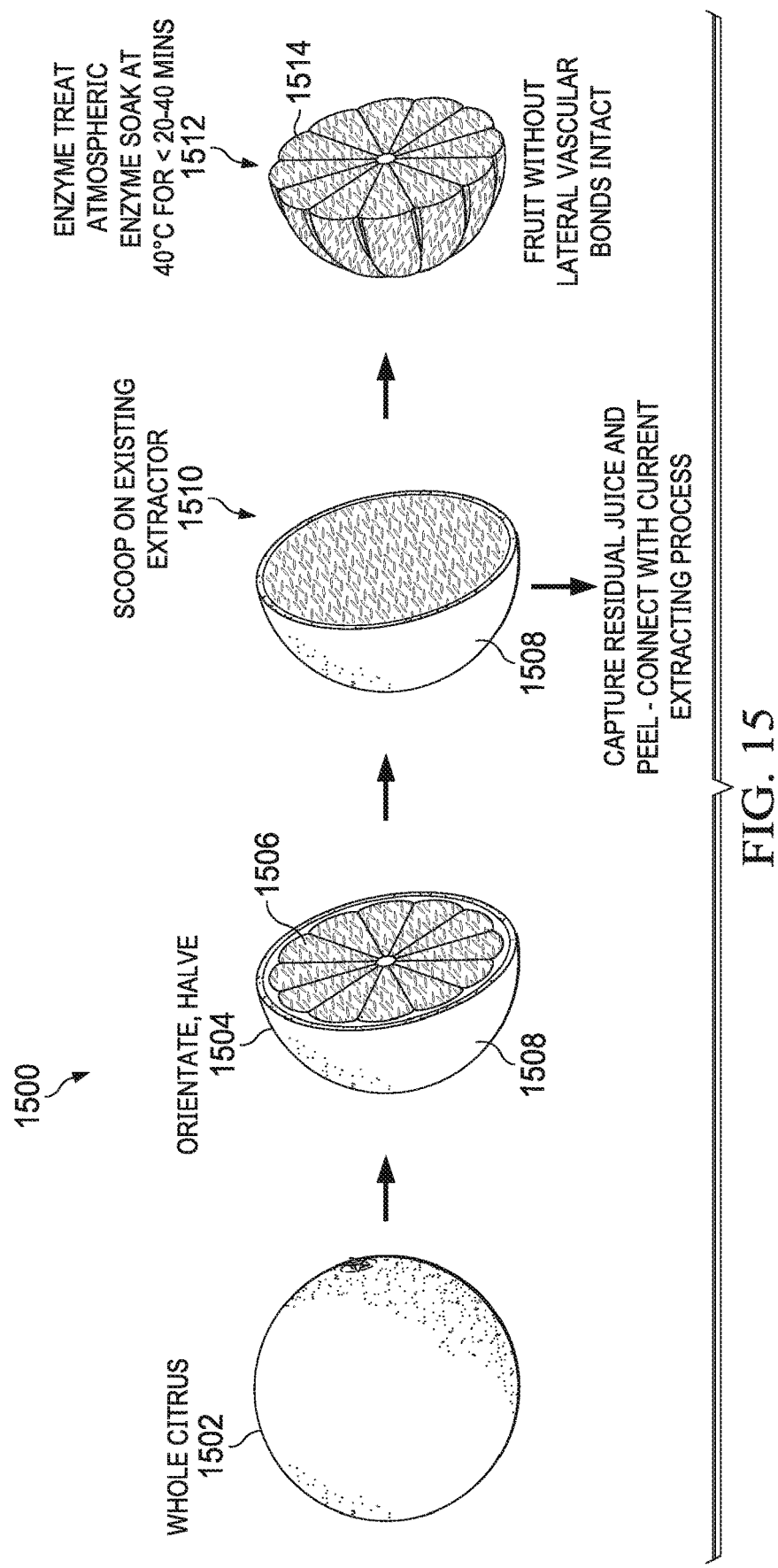
FIG. 15 is an illustration of an illustrative mechanical scooping process for extracting a fruit portion from the citrus fruit for further processing to separate whole juice sacs from the fruit portion.

With regard to FIG. 15, an illustration of an illustrative process for processing a citrus fruit 1502 using a scoop and enzyme treatment process is shown. As shown, the citrus fruit 1502 may be cut or sliced in half to produce half a citrus fruit 1504 with its fruit portion 1506 available for scooping from the citrus peel 1508. In one embodiment, the citrus fruit 1502 may be oriented in a particular manner, such that the cutting of the citrus fruit 1502 may be performed along or through the core of the citrus fruit 1502. At step 1510, the half citrus fruit 1508 may be scooped utilizing the techniques as described with regard to FIGS. 3-5. The peel 1508 along with residual juice may be collected and utilized to produce additional juice and flow into a citrus waste stream for producing fiber from any remaining albedo or other material from the citrus fruit 1502. At step 1512, a fruit portion 1514 of the citrus fruit 1502 that has been scooped from the peel 1508 may be enzyme treated in the same or similar manner as described with regard to steps 1212, 1308, and 1408 of FIGS. 12, 13, and 14, respectively. Any eluate inclusive of fiber from the enzyme treatment of the citrus fruit 1502 may also be captured as a byproduct for use in manufacturing paper or cardboard.

Figure 16:
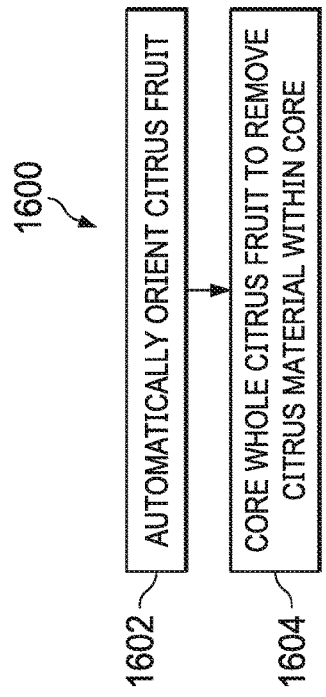
FIG. 16 is a flow diagram of an illustrative process for coring whole citrus fruit to remove citrus material within a core of the citrus fruit prior to performing other operations, such as an enzyme treatment to degrade pectin from the citrus fruit.

With regard to FIG. 16, a flow diagram of an illustrative automated coring process 1600 is shown. The automated coring process 1600 may start at step 1602, where a whole citrus fruit may be automatically oriented or aligned with a coring element of a coring station for coring the citrus fruit. The automatic orientation or alignment may be performed using any of a number of different techniques, including imaging and reorienting the citrus fruit based on the imaging, rotating the citrus fruit to cause the citrus fruit to self-align, or otherwise. At step 1604, the whole citrus fruit may be cored to remove citrus material within the core that is not useful in terms of collecting whole juice sacs from the citrus fruit. The coring element may be sized to match a particular dimension of the core of the citrus fruit based on overall dimensions (e.g., circumference) of the citrus fruit. In other words, citrus fruit of different dimensions may have different cores of different diameters. By matching the coring element diameter with the citrus fruit core diameter, higher yield of juice sacs and higher production rates may result. In one embodiment, the coring element is dynamically adjustable such that the diameter can be adjusted to substantially match a diameter of the diameter of the core of a citrus fruit. In one embodiment, the coring element is a mechanical bit having a tubular configuration. In an alternative embodiment, the coring element is a laser configured to produce a laser beam sufficient power to vaporize or otherwise remove citrus material within a core of a citrus fruit. An adjustable element, such as an iris, may be utilized to dynamically adjust diameter of a laser beam produced by the laser. Alternative devices and methodologies may be utilized as the coring element to remove citrus material in the core of the citrus fruit.

Figure 17:
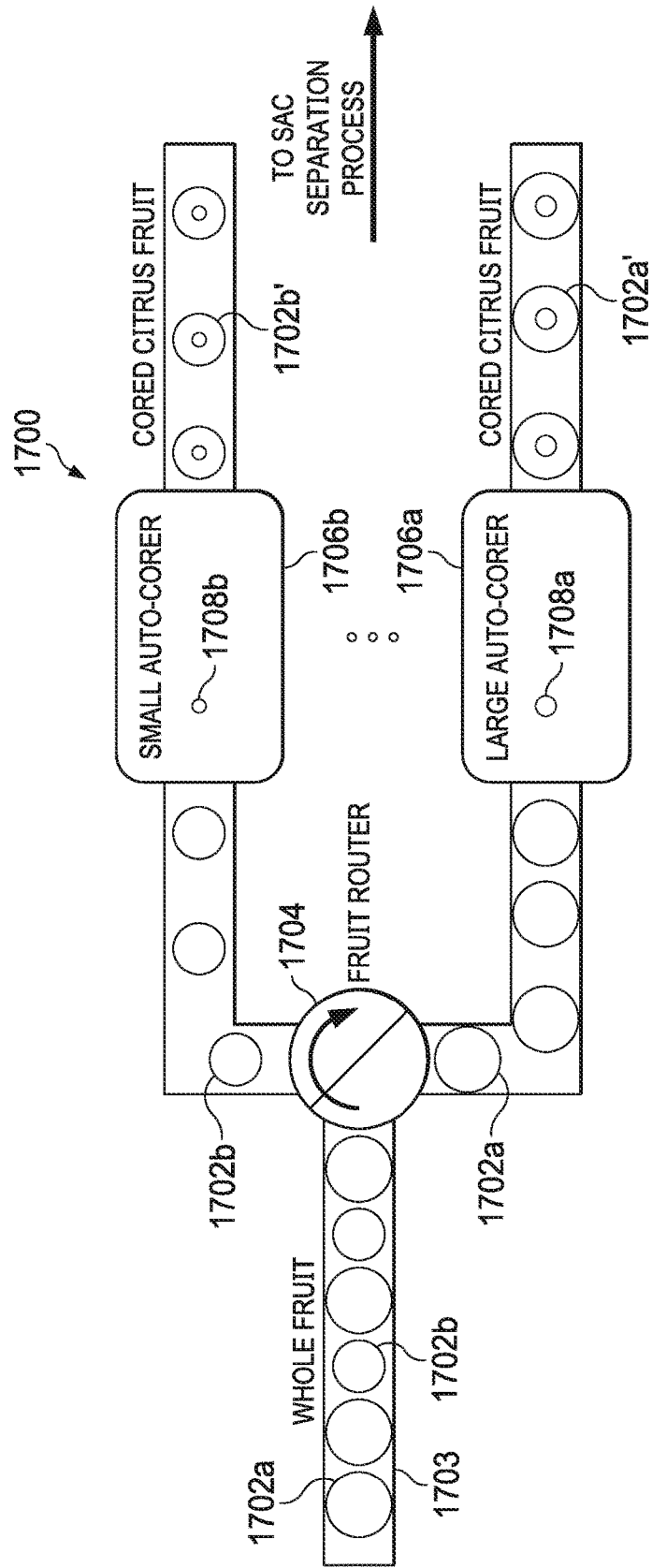
FIG. 17 is an illustration of an illustrative fruit separation and coring station for use in selectively categorizing the fruit based on size to match a core size with an automated coring station used to core the whole fruit.

With regard to FIG. 17, an illustration of an illustrative system 1700 configured to sort whole citrus fruit 1702a and 1702b (collectively 1702) of different sizes on a track 1703 to be sorted by a fruit router 1704 is shown. It should be understood that the configuration of the track 1703 and fruit router 1704 are illustrative and that other conventional devices and techniques for moving and sorting the citrus fruit 1702 according to size may be utilized. A small auto-coring station 1706a and large auto-coring station 1706b (collectively 1706) are shown to be used for coring the respective sized citrus fruit 1702a and 1702b. The small and large sizes are with respect to the dimension of the respective coring elements 1708a and 1708b. That is, the large auto-coring station 1706a has a coring element 1708a configured to core a larger diameter core of a large sized citrus fruit 1702a, while the small auto-coring station 1706b has a coring element 1708b configured to core a smaller diameter core of a small sized citrus fruit 1702b. As understood in the art, overall dimensions of the citrus fruit 1702 is generally indicative of the diameter of the core. Thus, having multiple diameter coring stations 1706a and 1706b (i.e., coring stations with different diameter coring elements), improved yield of whole juice sacs, improved speed of pectin removal of the citrus fruit 1702, and lower use of enzymes result due to more pectin in the core being removed from the citrus fruit 1702 without damaging the juice sacs at or near the core of the different sized citrus fruit 1702. From each of the coring stations 1706a and 1706b, cored citrus fruit 1702a' and 1702b' (i.e., the citrus fruit 1702a and 1702b with cores removed) are continued to a juice sac separation process, such as those described herein. Although not shown, other automated mechanical processes may be performed on the citrus fruit 1702 prior to or after the coring process, including scoring and puncturing the peel of the citrus fruit 1702.

Figure 18:
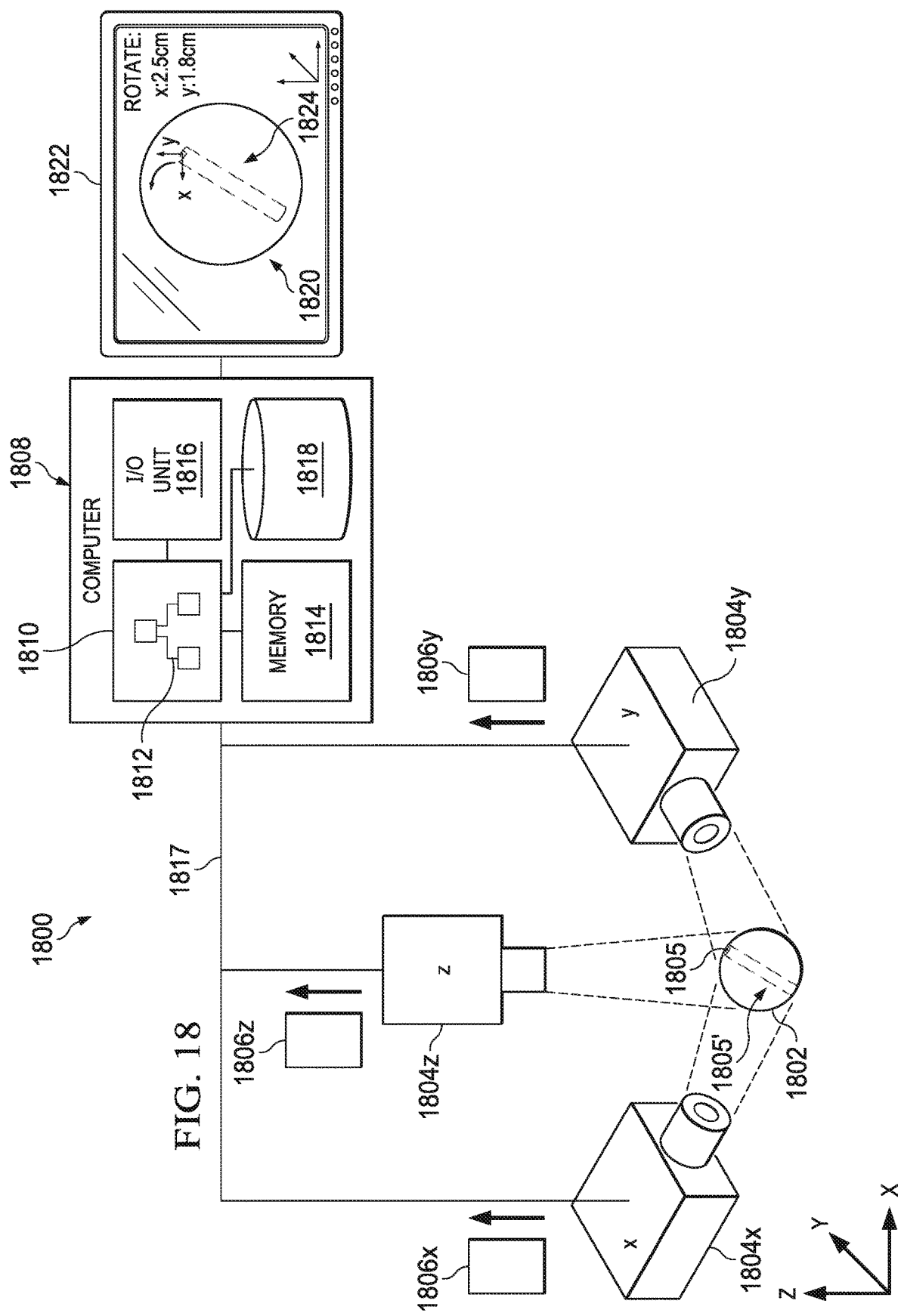
FIG. 18 is an illustration of an illustrative system configured to image a fruit so that the fruit may be automatically aligned with a coring element of a coring station prior to coring.

With regard to FIG. 18, an illustration of a system 1800 that may be used to image a whole citrus fruit 1802 that is being prepared to being cored. The system 1800 may include multiple imaging devices 1804x, 1804y, and 1804z (collectively 1804), where the imaging devices 1804 image the citrus fruit 1802 along respective x-, y-, and z-axes. As a result of having the three imaging devices 1804, an indicia 1805 (e.g., external core identifier, bumps, etc.) of the core or the core 1805' may be imaged for use in determining orientation of the core of the citrus fruit 1802. Digital images 1806x, 1806y, and 1806z (collectively 1806) or other data indicative of a position of the core (or no core) of the citrus fruit 1802 as represented in the images may be communicated from the imaging devices 1804 to a computing device 1808. The imaging devices may use visible wavelengths or non-visible wavelengths, such as IR, UV, xray, or any other wavelength, to capture the digital images 1806. If a visible spectrum is used, then features on the fruit 1802 may be captured for processing. If a non-visible spectrum is used, then features within the fruit, such as open space, particular colors (natural or computer generated), or lower densities within the fruit 1802 may be captured and/or highlighted for processing to determine orientation of the core 1805' with respect to the coring element.

The computing system 1808 may include a processing unit 1810 that executes software 1812 configured to cause the processing unit 1810 to perform computational and communication operations. The processing unit 1810 may be in communication with a memory configured to store data and program instruction, I/O unit 1816 configured to communicate data, such as the images 1806 over a communications network 1817, and storage unit 1818 configured to store information, such as the images 1806, for use in processing by the processing unit 1810. The software 1812 may cause the processing unit 1810 to process the images 1806 to identify orientation or alignment of the core of the fruit 1802 with respect to the coring element. In one embodiment, the computing device 1808 may generate a composite image 1820 on an electronic display 1822. The composite image 1820 may be 2-dimensional or 3-dimensional. The software 1812 being executed by the processing unit 1810 may further determine alignment of the core within the fruit 1802 and generate a graphical representation 1824 of the core 1805'.

Figure 19:
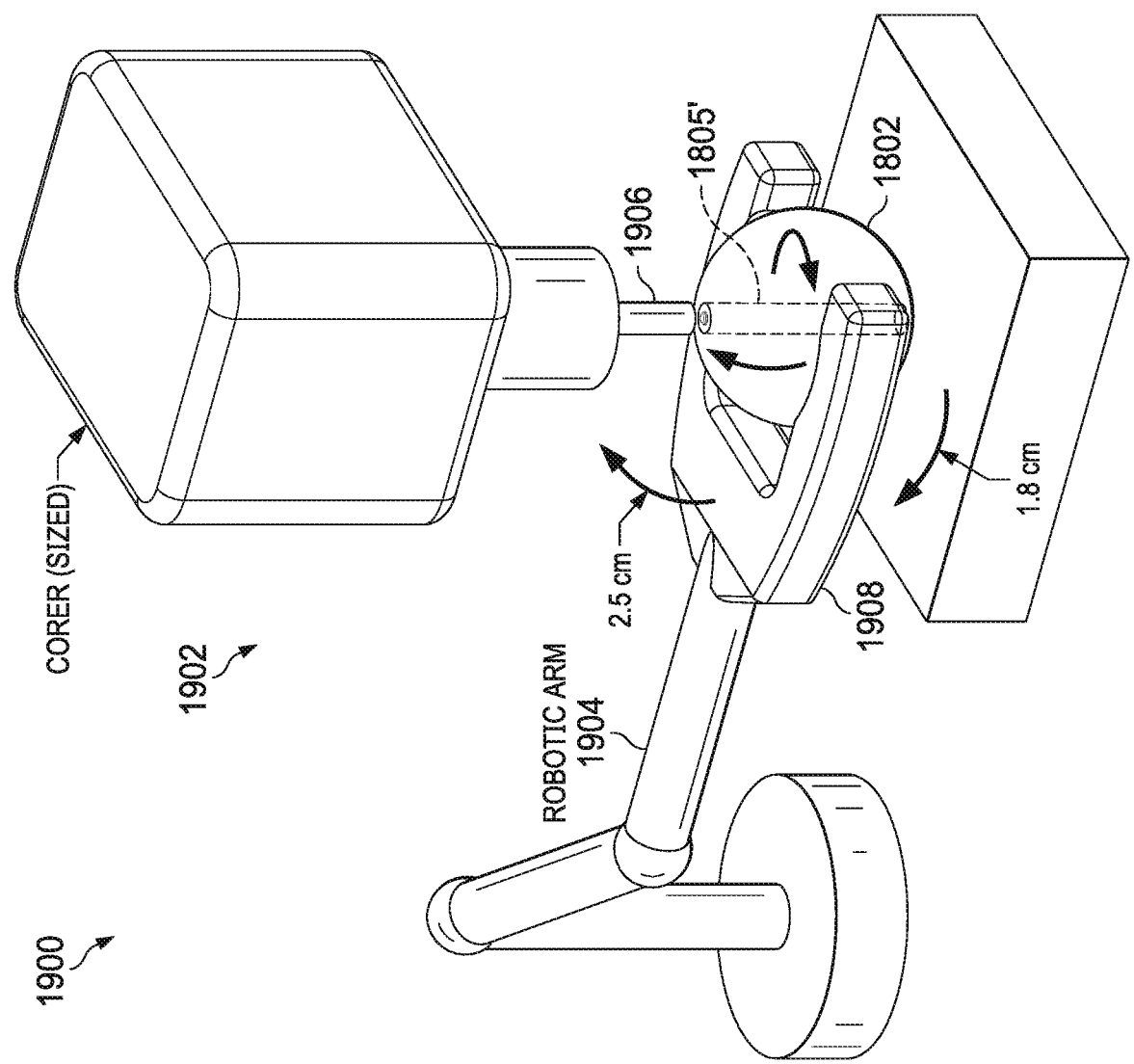
FIG. 19 is an illustration of an illustrative robotic arm configured to automatically align fruit for a coring station based on an image and computations made by the system of FIG. 18.

Additionally, the processing unit 1810 may compute rotational values that the fruit 1802 is to be rotated or otherwise re-aligned to cause the core 1805' of the fruit 1802 to be aligned with a coring element, as further provided in FIG. 19. The rotational values may be expressed in any one of Cartesian, polar, or spherical coordinates, as understood in the art. As shown, the core 1805' of the fruit 1802 is angled such that a rotation of 2.5 cm in the x-direction and 1.8 cm in the y-direction will align the core 1805' of the fruit 1802 to be aligned with a coring element 1906 (FIG. 19) of the coring station 1902.

With regard to FIG. 19, an illustration of an illustrative fruit coring environment 1900 may include a coring station 1902 and robotic arm 1904. The robotic arm 1904 may be in communication with and controlled by the computing system 1808 of FIG. 18. Alternatively, a different controller may be utilized. In operation, after the computing the rotational values, the computing device 1808 may communicate rotational values (not shown) to the robotic arm 1904 to cause a gripper 1908 of the robotic arm 1904 to grip the fruit 1802 and rotate the fruit 1808 to align the core with the coring element 1906.

It should be understood that the robotic arm 1904 is illustrative and that any type of robotic mechanism that is capable of re-aligning the fruit 1802 may be utilized in accordance with the principles of the present invention. It should also be understood that alternative techniques other than using imaging and robotic realignment through use of a robotic device may be utilized. For example, the fruit may be rotated within a cylinder filed with a liquid, such as water. The liquid may be rotated within the cylinder to cause the fruit 1802 to self-align by the core becoming perpendicularly aligned with the rotation of the rotating liquid. Once self-aligned, a clamping mechanism may lock the fruit 1802 in place to allow the core bit 1906 to drill therethrough.

Figure 20:
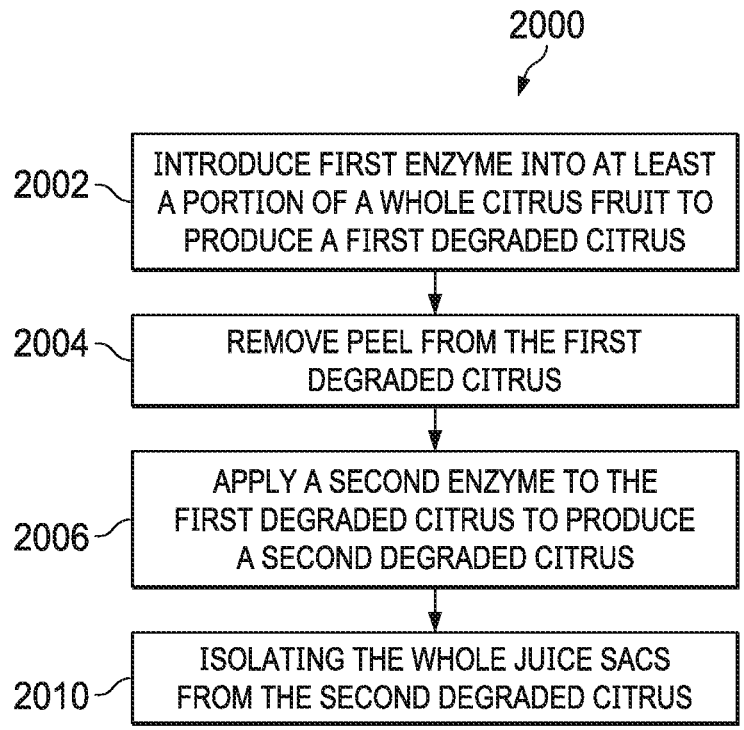
FIG. 20 is a flow diagram of an illustrative process for performing multiple enzyme treatments to isolate or separate whole juice sacs from a citrus fruit.

With regard to FIG. 20, a flow diagram of an illustrative process 2000 for performing multiple enzyme treatments to isolate or separate whole juice sacs from a citrus fruit is shown. The process 2000 may start at step 2002, where a first enzyme may be introduced into at least a portion of a whole citrus fruit to produce a first degraded citrus. The first enzyme may be introduced through "pricks" made to the peel of the citrus fruit that extends into the albedo. The enzyme may be a pectinase or alternative pectin digesting enzyme, as understood in the art or as created to be more effective in digesting pectin. In one embodiment, the first enzyme is injected into the citrus fruit. Alternatively, a vacuum that causes the first enzyme within an enzyme solution in which the citrus fruit is placed may be utilized. The degrading of the citrus fruit may be a digestion of pectin within the citrus fruit, and specifically of the albedo and a portion of segment walls of a fruit portion within the citrus fruit.

At step 2004, the peel may be removed from the first degraded citrus fruit. The removal of the peel may be performed automatically. If the peel of the citrus fruit had been scored, then the peel is more easily removable, especially if being automatically peeled. At step 2006, a second enzyme may be applied to the degraded citrus to produce a second degraded citrus. The second degraded citrus may have substantially all of the lateral strands, including segment walls, to which whole juice sacs are connected digested or otherwise degraded. As a result, the process 2000 may use step 2010 to isolate or otherwise separate the whole juice sacs from the second degraded citrus. In isolating the whole juice sacs, hot liquid, such as water, may be sprayed onto the second degraded citrus to melt or otherwise remove any wax or bonding material still connecting the whole juice sacs with other portions of the second degraded citrus. Other mechanical and/or fluid dynamic techniques, as further described herein or understood in the art may be utilized to isolate the whole juice sacs.

Figure 21:
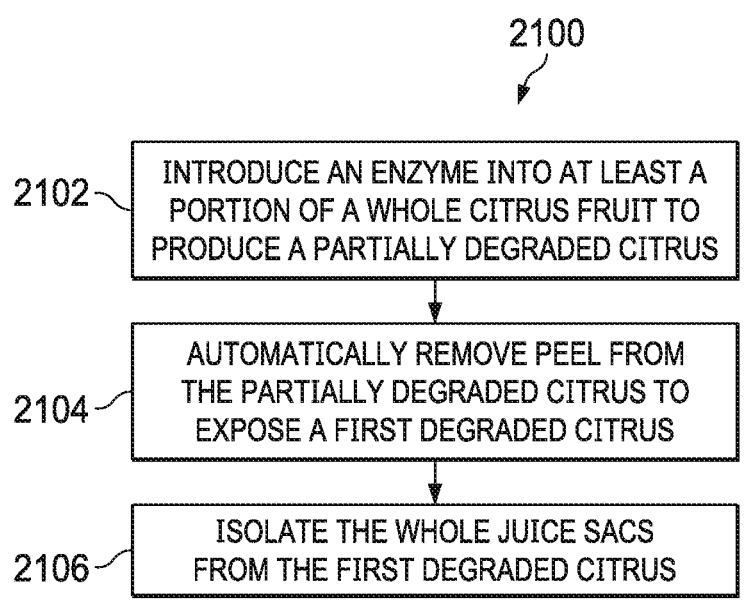
FIG. 21 is a flow diagram of an illustrative enzymatic-mechanical process for isolating whole juice sacs from a citrus fruit.

With regard to FIG. 21, a flow diagram of an illustrative enzymatic-mechanical process 2100 for isolating whole juice sacs from a citrus fruit is provided. The process 2100 may start at step 2102, where a first enzyme may be introduced into at least a portion of a whole citrus fruit to produce a partially degraded citrus. In being partially degraded, pectin in the albedo and segment walls of the citrus fruit may be degraded, but other pectin to which juice sacs are connected within the fruit portion of the citrus may at least in part remain intact. At step 2104, the peel may be automatically removed from the partially degraded citrus to expose a first degraded citrus. At step 2106, whole juice sacs may be isolated from the first degraded citrus. The isolation may be performed in the same or similar manner as provided with regard to step 2010 of FIG. 20. Because pectin in the segment walls and other components in the citrus fruit remains, mechanical and/or hydraulic operations may be less effective than the same or similar processing being applied to the second degraded citrus of FIG. 20, but still produce a high percentage of whole juice sacs of the overall number of juice sacs in the citrus fruit, as described with regard to FIGS. 13 and 14.

Figure 22:
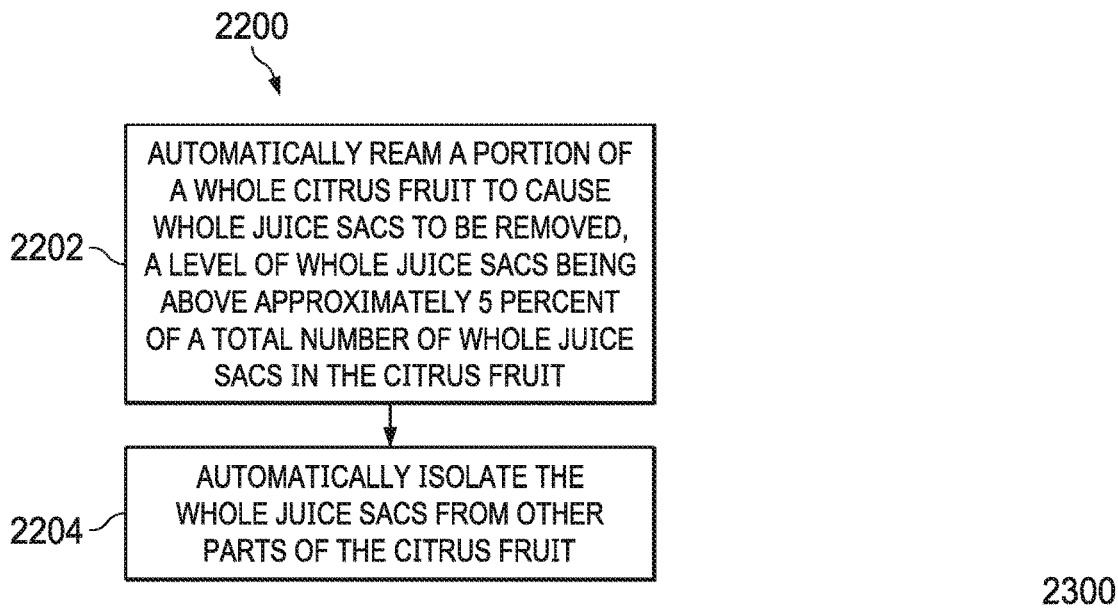
FIG. 22 is a flow diagram of an illustrative process for automatically reaming a whole citrus fruit for use in separating whole juice sacs from the citrus fruit.

With regard to FIG. 22, a flow diagram of an illustrative process 2200 for automatically reaming a whole citrus fruit for use in separating whole juice sacs from the citrus fruit is shown. The process 2200 may start at step 2202, where a portion of a whole citrus fruit may be automatically reamed to cause whole juice sacs to be removed. A level of whole juice sacs being removed may be above approximately 5 percent of a total number of whole juice sacs in the citrus fruit. The high percentage of whole juice sacs that are removed from automatic reaming process may be as a result of a "gentle" reamer design. One embodiment of such a gentle reamer is shown in FIG. 6. As a result of using a "gentle" reamer, other techniques, such as single or double enzyme treatments in combination with mechanical and/or hydraulic treatments, may be avoided. At step 2204, the whole juice sacs may be automatically isolated or separated from other parts of the citrus fruit after the automatic reaming process. The automatic reaming may return less percentage of the whole juice sacs than other processes described herein, but still a significantly higher percentage and higher production rates than existing techniques. And, the "gentle" reaming process may be faster and less labor intensive than the other processes presented herein.

Figure 23:
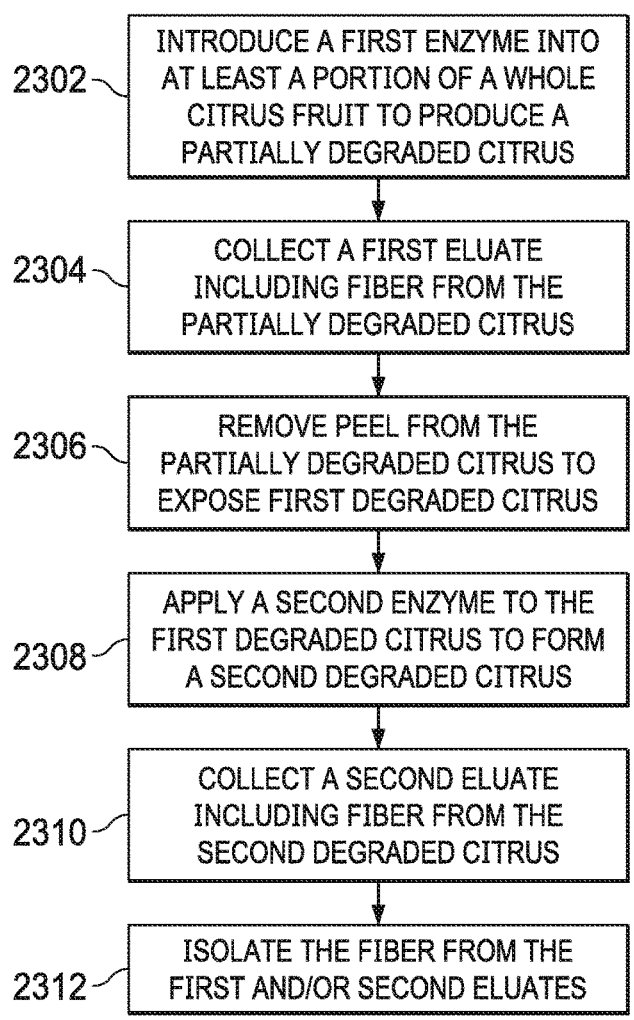
FIG. 23 is a flow diagram of an illustrative process for producing a byproduct of eluate inclusive of fiber using a multi-enzymatic process for separating whole juice sacs from a citrus fruit.

With regard to FIG. 23, a flow diagram of an illustrative process 2300 for producing a byproduct of eluate inclusive of fiber using a multi-enzymatic process for separating whole juice sacs from a citrus fruit. The process 2300 may start at step 2302, which may introduce a first enzyme into at least a portion of a whole citrus fruit to produce a partially degraded citrus. The introduction of the first enzyme may be performed by puncturing the peel of the citrus fruit, as previously described. At step 2304, a first eluate including fiber from the partially degraded citrus may be collected. At step 2306, the peel from the partially degraded citrus may be removed to expose first degraded citrus. In addition to the eluate, other fibrous material, such as albedo and peel, may be collected. At step 2308, a second enzyme may be applied to the first degraded citrus to form a second degraded citrus. The second enzyme may be used to digest or otherwise degrade remaining pectin not degraded from the first enzyme treatment. At step 2310, a second eluate including fiber may be collected from the second degraded citrus. The first and second eluate may include the same or different fibrous compositions and configurations (e.g., respective long and short fibers). At step 2312, the fiber from the first and/or second eluates may be isolated. The isolated fibers may be used for inclusion with wood fiber for manufacturing other materials, such as paper and cardboard.

Although enzyme treatments were described as being useful to degrade pectin within the citrus fruit as part of the juice sac separation process, alternative processes for degrading pectin in the citrus fruit may be utilized. Such alternative processes may include thermal processes, chemical processes, oxidative processes, and treatment with microorganisms (e.g., fungi, bacteria, etc.) processes, as understood in the art. As with the enzymatic process, one or more of these processes may be used in place of the one or more enzymatic processes described herein to degrade the pectin in the citrus fruit for separating the whole juice sacs from the citrus fruit.

The principles of the present invention further provide for a method for processing fruit by-product to produce fruit fiber, including fruit fiber from a multi-stage enzymatic treatment of the fruit portion of a citrus fruit. The process may include pre-processing the fruit by-product by (i) providing a fruit by-product, (ii) treating the fruit by-product to produce a refined fruit by-product, and (iii) optionally neutralizing charge of the refined fruit by-product to produce neutralized fruit by-product. In one embodiment, a brightening agent, such as bleach, may be applied to the fruit by-product to produce a brightened fruit by-product and, consequently, brightened fruit fiber, thereby being more readily usable to be included in a wider variety of paper and packaging.

The refined and/or neutralized fruit by-product can be treated further (e.g., dried, brightened, further refined, filtered, and screened) to provide a fruit fiber that can be used for different papers and/or packaging processing. Fruit by-product may be any components of an edible fruit of a plant that remains after processing the edible fruit to produce food for human or animal consumption. For instance, fruit by-product includes but is not limited to internal membranous tissue within the fruit. This tissue includes, but is not limited to albedo, endocarp, segment membranes and the like, of citrus, as is known in the art. Fruit "by-product" includes pulp and other subfractions, such as peel (exocarp), seeds and the like. As used herein, "pulp" includes sub-fractions of citrus, such as albedo (mesocarp), segment (endocarp), and segment membranes. Generally, the term "fiber" is used to refer to extracted fibrous material from fruit by-product, as opposed to "by-product" or "pulp," which refers to the fiber and other structural and chemical compositions (e.g., pectin) in edible fruit.

Figure 24:
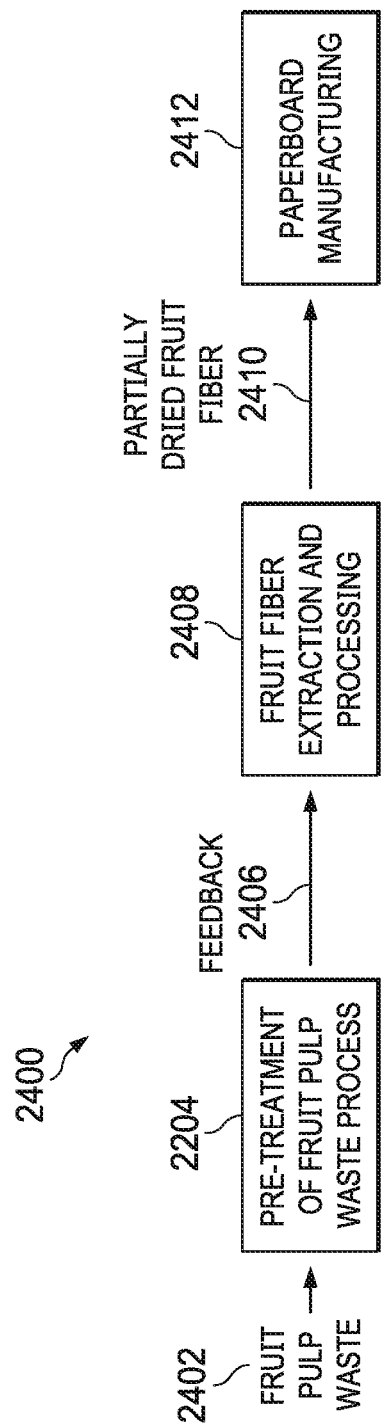
FIG. 24 is a flow diagram of an illustrative process for pre-treating wet fruit pulp by-product and treating fruit fiber for use in paperboard manufacturing.

With regard to FIG. 24, a flow diagram of an illustrative process 2400 for pre-treating fruit by-product and treating fruit fiber for use in paperboard manufacturing is shown. The process 2400 may start by providing fruit by-product 2402, such as wet fruit by-product, into a pre-treatment of fruit by-product process 2404. The process 2404 may be used to prepare a feedstock 2406 by washing, removing molasses, and removing non-fibrous matter (e.g., leaves, seeds, solids with sugars, and other components and plant parts, such as wood, stalks, and leaves), and/or applying a brightening agent to the fruit by-product 2402. By pre-treating the fruit pulp by-product 2402 to be cleaner, and hence brighter, the fruit by-product may be a better feedstock than currently available, which is generally cattle feed pellets with molasses. In accordance with the principles of the present invention, the feedstock may be provided from the process 2404 in a variety of forms, including a slurry, pellets without binding material, cellulose feedstock with about 1% to about 10% fiber, or in some embodiments about 2% to about 5% fiber, or otherwise.

The feedstock 2406 may be provided to a fruit fiber extraction and processing process 108. The process 2408 may extract or otherwise isolate fruit fiber from the fruit pulp. The process 2408, in addition to extracting fruit fiber from the fruit pulp, may also brighten the fruit fiber, as further described herein with regard to FIG. 26, so as to be brighter and more usable for different types of paper, such as product packaging and writing paper. Output from the process 108 may be partially dried fruit fiber 2410. In one embodiment, the partially dried fruit fiber 2410 may be in the form of wet lap. In drying the fruit fiber 2410, any system and process for partially drying the fruit fiber may be utilized, including but not limited to using mechanical force (e.g., compressing the fruit fiber), air drying, fluidized bed drying, P-ring drying, freeze drying, and the like, or combination thereof.

Figure 25:
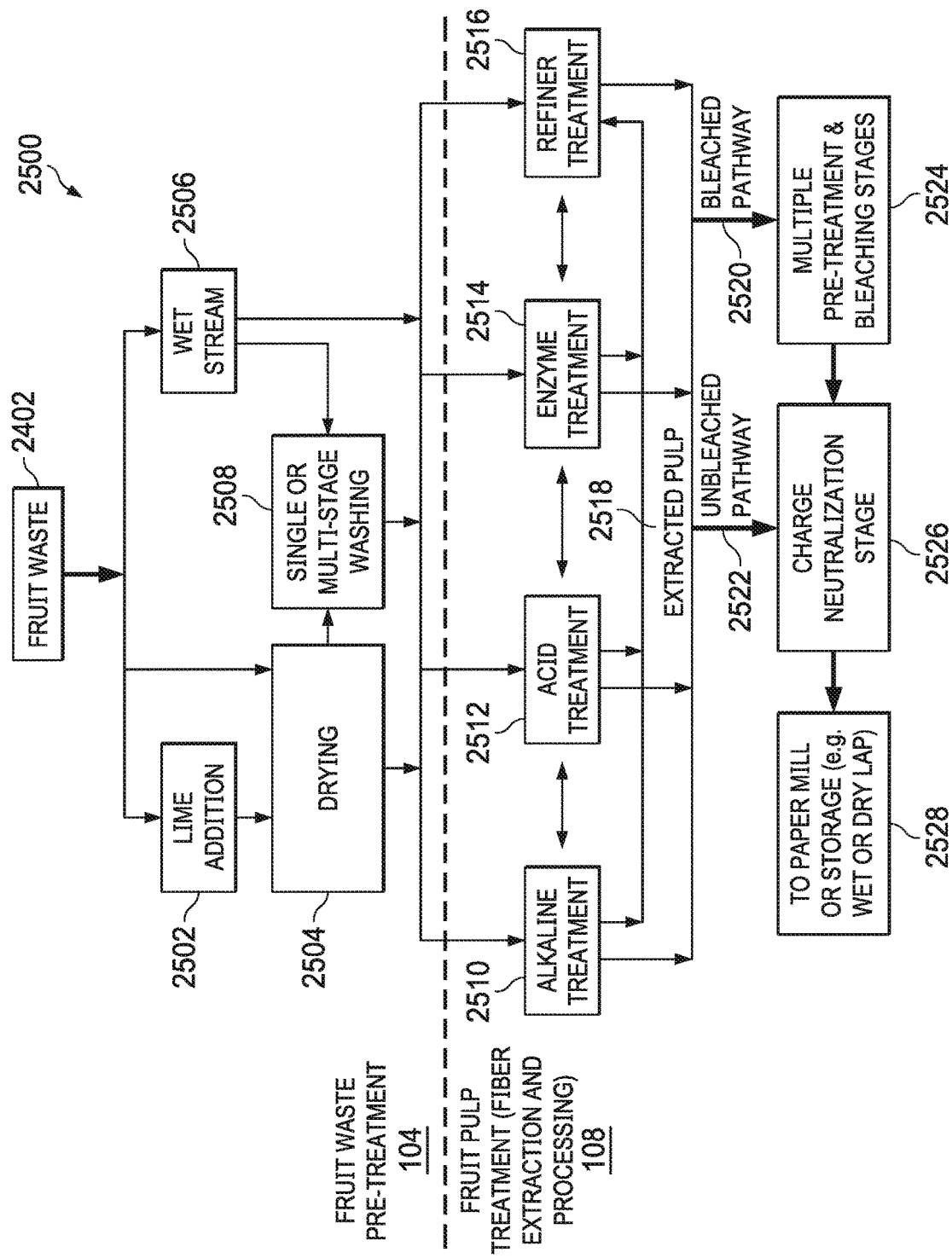
FIG. 25 is a flow diagram of a more detailed illustrative process for pre-treating wet fruit pulp by-product and treating fruit fiber for use in paperboard manufacturing.

With regard to FIG. 25, a more detailed illustrative process 2500 for the fruit by-product pre-treatment process 2404 and the fruit fiber treatment process 2408 to extract and process fruit fiber for use in paperboard manufacturing is shown.

A. Fruit by-Product

The fruit by-product 2402 provided to the pre-treatment process 2404 may vary amongst different fruits, but contain an adequate amount of pulp and fiber for use as a wood fiber replacement. The fruit by-product may be wet by-product, never dried by-product or pulp (fresh-never dried by-product or pulp), dry by-product or pulp, or pelleted by-product or pulp. The fruit by-product 2402 may contain residual peel, rags/sacks, and seeds, as described further herein. In one embodiment, the fruit by-product is a citrus by-product and is in the form of citrus pellets, which, as understood in the art, is commonly used as animal feed.

Pelleted fruit by-product may be produced in varying ways using a variety of fruit source materials that may impact the content and characteristics of the pellet, as understood by one skilled in the art. For example, specific processing procedures vary from one production source to another and may vary with in the same source throughout the season. The basic procedure for producing fruit pellets generally includes grinding or chopping fruit and then dehydrating the fruit residue. The fruit residue is either dehydrated or pressed and molasses is produced from the press liquor. A portion of the molasses is sometimes added back to the fruit pulp during a drying process to bind the pulp by-product. The finer particles of the dried pulp are often removed and either sold as citrus meal or pelleted and added back to the pulp. These and other differences in processing, in source and variety of fruit, and in type of fruit/food processing operation from which the fruit residue is obtained, may result in variations in the content of dried fruit pulp. However, by not including molasses, a brighter fruit by-product, in whatever form, may be provided to the fruit pulp treatment process 2408.

Upon receipt, dry fruit pellets containing peel, rags and seeds may be tested for moisture content using a drying oven and scale. Moisture content may range, for example, between about 7% and about 18%. The fruit pellets used in subsequent treatments may be stored in tanks, bags, vats, and/or drums.

B. Fruit

Continuing with the fruit by-product 2402, any edible fruit grown from a plant may be suitable for use with the principles of the present invention. The fruit by-product 2402 may include by-product from a single fruit variety or multiple fruit varieties. For example, citrus fruit varieties suitable for use in producing fiber for use in producing paper may include, but are not limited to, any fruit from the Citrus genus, such as oranges, sweet oranges, clementines, kumquats, limes, leeche limes, satsumas, mandarins, tangerines, citrons, pummelos, lemons, rough lemons, grapefruits, tangerines and tangelos, or hybrids thereof. The citrus fruit may be early season, mid-season, or late-season citrus fruit. The pectin content of fruit may vary based on season, where ripe fruit may contain less pectin than unripe fruit. It should be understood that non-citrus fruits (e.g., apples) may alternatively or additionally be utilized. Thus, in one embodiment, the principles of the present invention provide for a method for isolating and processing non-citrus fruit by-product to obtain non-citrus fruit pulp or fiber. These materials are also useful in the production of paper and packaging papers, where they may also serve as a substitute for wood fiber. These non-citrus fruits include, for example, apple, mango and papaya. The fiber and pectin content of these non-citrus fruits would be understood by one of skill in the art to vary.

In one embodiment, the fruit by-product may include citrus by-product from oranges. In one embodiment, mid-season fruits (e.g. Pineapple and Sunstar varieties) and late-season fruits (e.g. Valencia) may be used to provide adequate cellular fibrous material.

The fruit by-product may include all fruit by-product or a specific fraction of the fruit by-product, where fractions may include, but are not limited to, peels, rags, sacs, and seeds. In one embodiment, peels and rags/sacks are used as a fruit fiber source. In one embodiment, albedo, endocarp, segment membranes and/or vesicle membranes are used as fiber sources individually or in combination.

The solid fruit concentration of the fruit by-product may vary. In one embodiment, the fruit by-product is a wet fruit by-product having a solid fruit concentration of from about 4% to about 30%. In another embodiment, the solid fruit concentration of the wet fruit by-product is about 8% to about 20%. In another embodiment, the fruit by-product is a dry fruit by-product having a solid fruit concentration of from about 80% to about 95%. In a specific embodiment, the dry fruit by-product has a solid fruit concentration in a range from about 84% to about 95%. The fruit by-product may vary based on type of fruit, density of fruit by-product, concentration of fruit by-product, wetness of fruit by-product, and so on.

C. Pre-Treatment Process

With further regard to FIG. 25, the fruit by-product may optionally be pre-treated prior to digestion in order to prepare the material for subsequent treatment steps. The pre-treatment process 2404 may involve a single step or multiple steps, where multiple steps may be the same or different. The pre-treatment process 2404 may include adding lime to the fruit by-product to dewater the fruit by-product 2402 at step 2502. At step 2504, the fruit by-product 2402, which may or may not have had lime added thereto, may be dried. The drying process may include partially or fully drying the fruit by-product 2402, with or without lime. In an alternative embodiment, the fruit by-product 2402 may be processed as a wet stream at step 2506. In one embodiment, single or multi-stage washing processes may be performed at step 2508. The washing processes may cause the fruit pulp that is part of the fruit by-product to be cleaned and brightened. Baths, high-pressure spray, gentle shower, and any temperature water may be used. Other steps for pre-treating the fruit by-product may be performed, including performing a dewatering step (not shown) that may be part of the drying process at step 2504 or post the washing process at step 2508.

More specifically, washing processes 2508 may vary, for example, in temperature or number of washes. The water may be cold, ambient (23-27° C.) or hot (50-60° C.). Hot water has been shown to remove more soluble components on a relative basis than an equivalent amount of ambient water (e.g., 1% to 5% more). Fresh water washing or a multistage, countercurrent scheme may be employed. Multistage washing has been shown to remove more soluble materials than a single washing (e.g., 1%-4% more). In a particular embodiment, the number of washing steps may range from two to five or more. The washing step(s) may occur at a fruit juicing plant or at an offsite-processing location. Washing may occur with or without stirring/agitation (i.e., in a quiescent environment). In one embodiment, the washing process at step 2508 may remove from about 1%, about 2%, about 3%, about 4%, about 5%, about 6%, about 7%, about 8%, about 9%, about 10%, about 11%, about 12%, about 13%, about 14%, about 15%, about 20%, about 25%, about 30%, about 35%, about 40% or about 50% of the soluble materials.

In a particular embodiment, untreated pellets are transferred to a suitable vessel and washed with multiple (e.g., 9) times its weight (10% solids) in ambient (23-27° C.) water to both swell the pellets and remove water soluble materials for a minimum of about 10 minutes to about 15 minutes. pH may be monitored during the multistage pH neutral water washing of the pulp to determine when the pulp has been sufficiently rinsed.

To further improve brightness of the fruit pulp, a bleaching step (not shown) may be included. The bleaching step may use bleach or any other chemical or non-chemical process, as understood in the art. In a particular embodiment, the bleaching pre-treatment is a peroxide, alkaline peroxide, or oxygen-alkali treatment. In another embodiment, the bleaching pre-treatment step is involves treatment with hydrogen peroxide. For example, there are two, three, four or pre-treatment bleaching steps. By brightening the fruit pulp, fewer processes, which may be more time consuming and costly, may be performed in the fruit pulp treatment process 2408. In addition, an attrition step or any other step useful or necessary to prepare the material for subsequent digestion or brightening may be performed in the pre-treatment processes 2404.

In one embodiment, the pre-treatment step may reduce a water retention value (WRV) of the fruit by-product. WRV can be measured, for example, by centrifugally separating water retained in pulp from free water in and between fruit fibers.

In another embodiment, the pre-treatment process 2404 may decrease the chemical load (i.e., the presence of soluble materials, such as sugars or acids) of the material prior to digestion. The chemical load may vary depending upon the type of fruit by-product and/or the processing conditions used to generate the fruit by-product. Pretreatment to remove soluble materials may be particularly useful where molasses has been added to a fruit pellet during processing. Pellets to which molasses has been added may have far greater levels of soluble material (e.g., 40%-50% or so of the total weight of the dry pellet).

The pre-treatment process 2404 (FIGS. 24 and 25) may involve one or more dewatering steps. For example, the by-product may be subject to washing and then dewatered by any suitable technology, such as pressing swollen pellets through a screw press or over a vacuum-assisted drainage device, by centrifugal force, or by mechanical and/or fabric pressing. Solids and yield of the washed pellet by-product may then be determined by drying a sample. In a particular embodiment, the cake solids levels range may range from about 7% to about 33%.

In yet another embodiment, the pre-treatment process 2404 may include an attrition treatment (not shown). Attrition may, for example, permit bleaching chemicals used in another step additional or improved access to the material, i.e., so that diffusion is not limiting. A mechanical means may be used to continuously reduce the size of citrus by-product prior to any bleaching step in order to provide thorough diffusion access of the bleaching chemical to all parts of the by-product. In one embodiment, moderate shear devices (e.g., produced by British Disintegrator) may be used or a continuous and conventional pulp refiner (e.g., double disk refiner) with plate clearances between 0.125" and 0.010" may be used. In a particular embodiment, process temperatures may range from about 25° C. to 95° C. As the by-product mass is relatively soft, there are likely many mechanical and frictional means to provide moderate shear to break down larger citrus by-product particles. Optionally, this step may be performed after bleaching unless the fibers and cells are of a sufficient size after bleaching is complete. In one embodiment, the citrus pulp may be screened to exclude larger fiber bundles or unwanted citrus waste through slotted screens or hole screens common to the paper industry.

Continuing with FIG. 25, the fruit by-product treatment process 2408 may be used to extract and process fruit fiber. The extraction may be performed using a variety of different techniques and processes, as further described hereinbelow.

D. Digestion/Extraction Process

The digestion/extraction process of the fruit by-product treatment process 2408 may isolate fruit fibers and cell wall fragments useful in contributing as a constituent to a paper-making substrate. Pectin (polygalacturonic acid) acts as the stabilizing "cement" that holds cells together in peel, sacks, and seed ultra-structures of fruit. Specifically, pectin is present in cell walls and between the cells, where the middle lamella is a pectin layer that cements the cell walls of two adjoining cells together. A majority of the interlamellar cellular material in fruit is comprised of pectin. The amount of pectin may vary by fruit type or by season, as cell wall disassembly during ripening is the main process leading to fruit softening. The digestion/extraction process is performed to remove the pectin (viewed here primarily as a by-product product) in order to isolate the desired material, i.e., the fruit fibers.

Any method suitable for digesting or extracting fruit fiber is suitable for use in accordance with the principles of the present invention. Digestion methods may include, without limitation, chemical treatment, such as an alkaline treatment 2510 and/or acid treatment 2512, enzymatic treatment 2514, refiner/mechanical treatment 2516, or a combination thereof.

The alkaline treatment 2510 may be used to digest pectin of the fruit by-product. The alkaline treatment may include, without limitation, sodium hydroxide and sodium sulfide, or combinations thereof. For convenience, an alkaline liquid to dry pulp ratio ranging from about 5:1 up to about 25:1 may be used to treat the pulp with alkali. The alkaline digestion may be carried out in a quiescent setting or by using agitation.

The acid treatment 2512 may alternatively or additionally be used to digest pectin of the fruit by-product. Acids that may be used to perform the digestion of the pectin may include mineral, including, without limitation, nitric acid, sulfuric acid, hydrochloric acid, phosphoric acid, boric acid, hydrofluoric acid, hydrobromic acid, and perchloric acid. Treatment liquor to pulp ratios in the range of about 5:1 to about 50:1 are suitable for use, although pectin removal may be facilitated by additional dilutions, e.g., 30:1. Target pH of the acid treatment may range from about 1.1 to about 2.3, although consumption of acid may require addition of acid during treatment. Optionally, a chelant (e.g., EDTA and DPTA) may be added during or after treatment to sequester any free metal ions freed from the digestion and treatment. In one embodiment, the pH may be increased post-treatment to enhance the effectiveness of the chelant. Moderate shear may optionally be applied by stirring or using agitation to facilitate extraction of a more-resistant pectin fraction.

In one embodiment, temperatures may be elevated (e.g., 70° C. to 160° C.) to accelerate solubilization of interlamellar material. Due to the presence of many organic acids naturally occurring in the citrus pulp and acidic hydrolysis products formed during processing, pH can drop to below neutral in the alkaline treated pulp. Monitoring pH during this stage may be performed so that refortifying the liquor with additional alkali to maintain higher target pH can be achieved. Alkali treatment can be applied for short periods of 15 and up to 120 minutes at target temperature and pH. Total heating time is determined by the temperature ramp rate controlled by the thermal load capacity of the equipment used in heating and by whether direct or indirect heating is employed.

In another embodiment, the fruit by-product may be digested by an alkaline treatment followed by an acid treatment. The combined use of alkaline and acid treatments is useful to reduce pectin levels early in processing steps due to the solubility of both calcium pectate and nascent pectin. The pH, residence time, and temperature of the chemical treatment can vary with regard to what type and variety of fruit is being extracted. In one embodiment, the pH range for the acid treatment is from about 1.1 to about 2.3 and more specifically, from about 1.6 to about 1.8. In one embodiment, the pH range for the alkaline treatment is from about 9.0 to about 12.50. In another embodiment, the residence time for the chemical treatment is from about 15 to about 120 minutes or more specifically, from about 60 to about 90 minutes. In yet another particular embodiment, the temperature ranges from about 70° C. to about 160° C.

In a particular embodiment, the alkaline treatment 2510 is applied in either a pressurized or open vessel. About 2.5% sodium oxide ($Na_2O$, applied as sodium hydroxide) is then applied with about 15% to about 20% $Na_2O$ causticity added as sodium sulfide. At 10% washed citrus pulp solids, chemicals are added and heat is applied by direct or indirect steam, depending on the vessel design, to about 90° C. pH is typically above 12.0 at the introduction of the chemicals and monitored throughout the caustic treatment. The pulp pH may drift as nascent acids neutralize the caustic liquor. After the pH drops to below 8.0, the alkaline treatment 2510 may be stopped as any substantial alkaline-driven reactions have ended. The pulp may then be washed to remove residual alkali and reaction products in hot water across a vacuum assisted drainage funnel or through a batch or continuous centrifuge, depending on the quantity treated. Solids and yield may then be determined.

In another particular embodiment, the acid treatment 2512 may be used to extract the fruit pulp by using a mineral acid, such as nitric or sulfuric acid. The pulp is suspended at about 4% solids in heated water with moderate agitation. The pulp may then be heated to about 60° C. to about 90° C. and acid added until a pH of 2.0 is achieved. pH may then be monitored about every 10 minutes as the acid is neutralized and/or consumed. A supplement of additional acid may performed to maintain the pH at a pH level of 2.0. After about 90 minutes, pH may then be adjusted upward to a range from about 3.8 to about 4.2 with sodium hydroxide and a chelant added at 800 ppm, based on starting citrus pulp solids. The chelant may be, for example, DPTA. The pulp may then be diluted to about 5% solid and pumped to a flow through double-disk mechanical refiner and then to a continuous centrifuge for dewatering. The outlet solids may range, for example, from about 15% to about 32%.

In another embodiment, the enzymatic treatment 2514 may be used for digesting pectin from the fruit by-product to extract the fruit pulp. An enzymatic treatment may be used as an alternative to the alkaline treatment 2510 and/or acid treatment 2512 or be used in combination with those digestion methods. The enzyme may be, for example, a pectinase. Representative, non-limiting pectinases include pectin galacturonase, pectin methylesterase, pectate lyase, and pectozyme. In a specific embodiment, the enzyme is a cocktail of pectin galacturonase pectin methylesterase, and pectatelyase. The pH and temperature conditions may be dictated by the particular enzyme, as is understood by one of skill in the art. In one embodiment, the temperature may range from about 25° C. to about 55° C. and the pH may range from about 3.5 to about 8.5.

In a still further embodiment, the fruit by-product may be digested by chemical treatment in combination with the refiner or mechanical treatment 2516. Where chemical treatment may be supplemented by an additional digestion or extraction, the additional mechanical treatment 2516 may be used before or after the chemical treatment. For example, a mechanical or enzymatic treatment can be used either pre- or post-chemical treatment.

Extracted fruit pulp 2518 from any of the treatments 2510, 2512, 2514, and 2516 may flow along two optional pathways, a bleached pathway 2520 and/or unbleached pathway 2522. If the extracted pulp 2518 flows along the bleached pathway 2520, multi pre-treatment and bleaching stages 2524 may be performed on the extracted pulp 2518 to further clean and increase brightness of the extracted pulp 2518, as further described with regard to FIG. 26. If the extracted pulp 2518 flows along the unbleached pathway 2522, then a charge neutralization stage 2526 may be used to neutralize charges of the extracted pulp 2518. In one embodiment, the bleached pulp may also pass through the charge neutralization stage 2526, which is described below. The wet or dry lap may be sent to a paper mill or storage at step 2528.

E. Charge Neutralization

Any suitable agent or process capable of modifying or neutralizing the size and charge effects of the refined or extracted fruit by-product or pulp 2518 can be used in accordance with the principles of the present invention. Neutralizing agents include, but are not limited to, cationic neutralizing agents including cationic monomers, cationic polymers, cationic coagulations, cationic flocculants, and nonpolymeric cationic species. Cationic coagulants are effective in neutralizing and drawing together components in the fruit pulp. A class of higher molecular weight cationic flocculants is also effective in tying smaller particles and appendages to larger particles, thus facilitating drainage. Poly-aluminum chloride (PAC) and aluminum sulfate (alum) or other cationic monomers have also each been found to be effective in reducing the charge in the citrus pulp, and thereby, facilitating drainage and dewatering. Adjusting pH to near-neutral after application of these moieties under acidic conditions may prove effective in insolubilizing these materials while satisfying cationic demand, once re-wet. In one embodiment, the neutralizing agent constitutes from about 0.5% to about 6.0% on an as-received pulp dry weight basis.

In a particular embodiment, the cationic agent satisfies about 30%, about 40%, about 50%, about 60%, about 70%, about 80% or about 90% or about 100% of the surface charge of the refined fruit pulp. The amount of the neutralizing agent may vary, as would be understood by one of skill in the art. In one embodiment, the neutralizing agent is about 2% to about 12.0% on a pulp dry weight basis. In one embodiment, the addition of the neutralization agent increases the drainage rate of the refined citrus pulp by greater than about 40%, about 50%, about 60%, about 70%, about 80%, about 90%. about 100%, about 200% or more in comparison to a refined fruit pulp not subject to neutralization.

F. Intermediate and Post-Treatment Steps

As discussed above, the method of the invention may optionally additional steps. In certain embodiments, the method involves one or more additional steps as part of the method itself, i.e., intermediate steps following digestion and/or prior to any final step. In other embodiments, the method involves one or more additional post-treatment steps following any final step. In each instance, the additional step is intended to prepare the material for further processing, including additional method steps or the production of an end product. When the additional step is intermediate, it is normally intended to remove a reaction product (e.g., acid) from the proceeding step. Non-limiting, suitable intermediate and/or additional steps may include, for example, washing steps, dewatering steps and/or bleaching steps.

G. Isolation of Fruit Fibers

Following digestion in one or more treatments according to any of the methods described herein, fruit fibers are released into the digest solution and, therefore, may be isolated for further processing. Isolation occurs by applying force to the solution such that the fibers are forced together to form a solid mass of isolated fibers. Force may be applied by a variety of methods as further described herein and include, but are not limited to a commercial centrifuge or decanter. Also, in this regard, the solid material following pectin digestion, such as by pectinase, may be isolated and used in any suitable method, such as in the preparation of animal feed.

It may be useful or necessary to dewater the isolated fiber produced by the methods outlined herein for further processing, including for the manufacture of paper. Fruit by-product or pulp contains fibers exhibiting a distinct fiber length distribution as compared to fibers from wood pulp and present some unique challenges for dewatering. Without being bound by any theory, it may be that fruit by-product or pulp also exhibits both surface and internal anionic charges that may enlarge the hydrodynamic surface of the fibers, thus impeding drainage. If the method is to include use of the fibers obtained from the fruit by-product or pulp to be integrated into a paper mill site, then subsequent treatment may be used so as reduce or eliminate drainage impedance during the papermaking process. If, however, the fiber obtained from the fruit by-product or pulp is to be manufactured and then stored as a wet or dry lap, then it may be also necessary to treat the fiber with dewatering agents converting it to a compact form for shipment.

Following isolation of the fibers, in one embodiment, the process 2500 optionally includes one or more intermediate bleaching treatments, as provided by the multiple pre-treatment and bleaching stages 2524. If the ultimate destination of the fruit pulp is for inclusion in an unbleached paper substrate, it may not be necessary to include a bleaching step. If, however, the fruit pulp is destined for inclusion into bleached products and specified pulp brightness is a feature of the pulp, then brightening process steps may be used to successfully achieve these objectives.

Brightness is generally defined as the percentage reflectance of blue light only at a wavelength of 457 nm. Brightness is typically measured/expressed as GE brightness. GE brightness is measured with directional light incident at 45° with respect to the normal to the sample. The photodetector is mounted on the normal and receives light reflected along the normal-conditions sometimes expressed by the shorthand notation (45° illumination, 0° observation). GE brightness is measured relative to a Magnesium oxide serves as the standard at a GE brightness of 100, where all pulp and paper has GE brightness less than 100.

Both oxidative and reductive bleaching chemistries may be employed in the high brightness development of citrus pulp. Oxidative approaches have proved most effective in both laboratory and pilot plant processes. The bleaching may involve a single or multiple steps. The bleaching agent may be, for example, chlorine dioxide. In a particular embodiment, the method involves a multi-step bleaching protocol as follows:

Bleaching Stage 1:

Chlorine gas or chlorine dioxide may be used at this stage, assuming compatibility with later chemistries. More specifically, chlorine dioxide is applied at between about 2% and about 8% levels at a range of moderate temperatures (50-65° C.) and reaction times (30 to 120 minutes). An aqueous washing stage may follow this bleaching treatment.

Bleaching Stage 2:

Stage 1 treatment creates reaction products that may or may not be removed with simple washing. Acidic oxidation stages (e.g. chlorine or chlorine dioxide used in Stage 1) may optionally be followed by alkaline extraction stage (Stage 2, pH>9.0) or alkaline peroxide stage are particularly effective in removing oxidized reaction products. An aqueous washing stage may follow this bleaching treatment.

Bleaching Stage 3:

Stage 3 treatment may be an oxidative bleaching stage. Depending on the final brightness required, this stage can create fruit pulps in the 80 GE brightness range. Acidic oxidation stages (e.g. chlorine or chlorine dioxide as used in Stage 1) or alkaline oxidation stages (e.g. sodium hypochlorite) can be employed at this stage. Chemical application rates are dependent on the final brightness target. While it may not be required, an aqueous washing stage may follow this bleaching treatment.

Subsequent Bleaching Stages:

Additional bleaching stages may be used to either further brighten the pulp to a higher target or provide a less aggressive chemical treatment in earlier and subsequent stages. In a particular embodiment, there are two or more bleaching treatments, including a first hydrogen peroxide pre-treatment treatment and one or more additional chlorine dioxide intermediate treatments.

In another embodiment, the one or more intermediate washing steps may be performed during the bleaching step(s). As an intermediate step, washing serves to remove solubilized reaction products. There may be a single or multiple intermediate washing steps, i.e., after a single bleach treatment step or after multiple bleach treatment steps. As with pre-treatment washing, the temperature and number of washings may vary.

In a still further embodiment, an optional dewatering step may be performed to remove water from the fiber obtained from the processed pulp. Suitable technologies for intermediate dewatering include, for example, drainage or vacuum disks, batch and continuous centrifugal separation, and mechanical pressing are non-limiting, representative methods and techniques suitable for use to remove water from the processed pulp.

In a particular embodiment, the intermediate treatment involves one or more bleaching steps followed by one or more washing steps.

In a specific embodiment for processing citrus pulp, a digested citrus by-product or pulp may be washed and then transferred to an indirect heated bleaching tower equipped with an up-flow axial contained screw design to facilitate both blending of chemicals with pulp and achieving uniform heating. The citrus pulp may then be heated to about 60° C. Alkaline peroxide is then added at an about 5% to about 10% application rate achieved a final solids of about 10% (on dry pulp) and at pH of about 10.5. After treatment for 1 hour, the pulp slurry may be diluted to about 5% solids and pumped to a continuous centrifuge for dewatering. Washed pulp is then transferred to the same indirect heated bleaching tower above and the citrus pulp is heated to about 60° C. Chlorine dioxide is added at an about 3% application rate to achieve a final solids of 10% (on dry pulp). After treatment for about 1 hour, the pulp slurry is diluted to about 5% solids and pumped to a continuous centrifuge for dewatering.

The washed pulp is then transferred to the same indirect heated bleaching tower as in the previous stage and the citrus pulp is heated to about 50° C. Sodium hydroxide is then added to achieve a final pH of about 11.5 to about 12.0 with solids of about 10% (on dry pulp). After treatment for about 1 hour, the pulp slurry may be diluted to 5% solids and pumped to a continuous centrifuge for dewatering. The washed pulp is once again transferred to the same indirect heated bleaching tower as in the previous stage. The citrus pulp may then be heated to about 60° C. Chlorine dioxide may then be added at about an about 2% application rate to achieve final solids of about 10% (on dry pulp). After treatment for 1 hour, the pulp slurry may be diluted to about 5% solids and pumped to a continuous centrifuge for dewatering.

Figure 26:
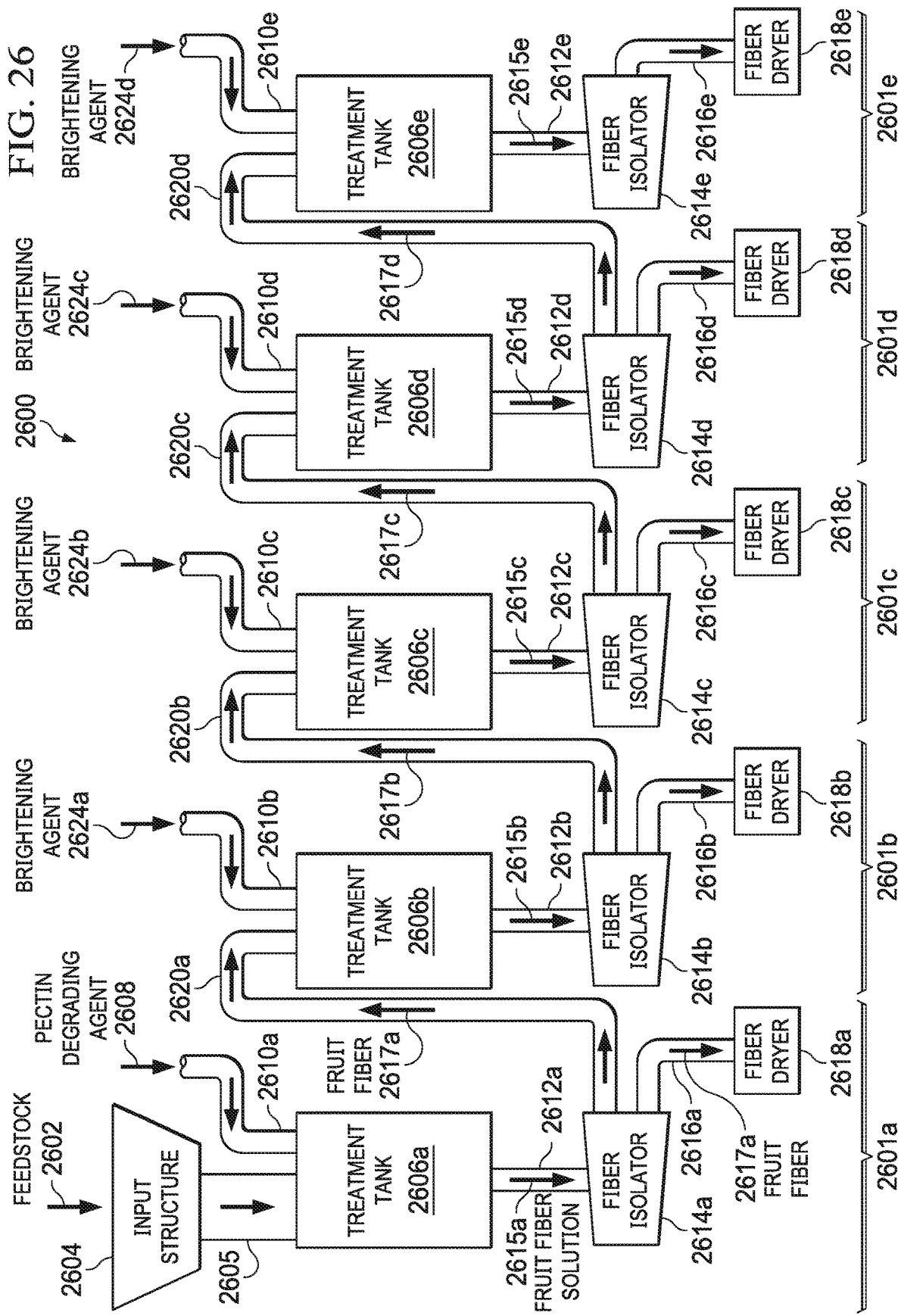
FIG. 26 is a schematic diagram of an illustrative system for use in extracting and processing fruit fiber to produce brightened fiber for use in paper and packaging products.

With regard to FIG. 26, a schematic diagram of an illustrative system 2600 for use in extracting and processing fruit fiber from feedstock 2602 and fruit portions of fruit (not shown) to produce brightened fiber for use in paper and packaging products is shown. The system 2600 includes multiple stages 2601a-2601e (collectively 2601) for use in extracting and processing the fruit fiber. The first stage 2601a may include an input structure 2604, such as a hopper, that allows for the feedstock 2602 to be input into a reactor or treatment tank 2606a of the system 2600 via a conduit 2605. The treatment tank 2606a may be configured to receive the feedstock 2602 for processing, such as removing pectin from the feedstock 2602 by using a pectin degrading agent 2608 via input conduit 2610a. The degrading agent 2608 may be any agent, such as an alkaline, acid, or enzyme, that may be mixed with the feedstock 2602 in the treatment tank 2606a for removing the pectin in the feedstock 2602. As a result of mixing the agent 2608 with the feedstock 2602, the pectin is removed from fruit fiber contained within the feedstock 2602, and a solution inclusive of the fruit fiber is formed.

An output conduit 2612a may be in fluid communication with a fiber isolator 2614a to transport fruit fiber solution 2615 (i.e., solution containing fruit fiber released from the fruit pulp). The fiber isolator 2614a may be a decanter, centrifuge, agitator, fiber refiner, or any other mechanical or electromechanical device that is capable of isolating or separating the fiber from the solution. As previously described, if the paper or packaging, such as brown paper bags, into which the fiber from the feedstock 2602 will be incorporated is not bright, then the fiber isolator 2614a may output the isolated fiber 2617a from the fiber isolator 2614a via conduit 2616a to a fiber water reducer 2618a. The fiber water reducer 2618a may be used to reduce or remove water from the fiber output from the fiber isolator 2614a to create a fiber with reduced water content for providing to a paper mill to be included with wood pulp in making paper products. The fiber water reducer 2618a may be a wide variety of machines that use a wide variety of processes, including a machine and process for making wet lap, dry lap, flour, or any other form of fiber material for delivery to a processing destination, such as a paper mill. The various machinery may include presses, dryers, and commercial wet lap machines.

As previously described, certain quality and types of papers are meant to be brighter or have certain qualities that use certain fiber types (e.g., finer or coarser fiber). In addition to using treatment tank 2606a to removing the pectin from the feedstock 2602, the principles of the present invention provide for additional reactor or treatment tanks 2606b-2606e. Each of these treatment tanks 2606 may be used to increase brightness of the fiber that is processed by a previous treatment stage by use of a brightening agent.

As shown, output conduits 2612a-2612e may flow the treated fruit fiber solutions 2615a-2615e from the treatment tanks 2606a-2606e (collectively 2606) to respective fiber isolators 2614a-2614e (collectively 2614). The fiber isolators 2614, as previously described, may be configured to isolate the fiber from solution or non-fibrous material. Conduits 2620a-2620d may transport fruit fiber 2617a-2617d isolated or otherwise separated from the solution by the respective fiber isolators 2614a-2614d. Conduits 2610b-2610e are used to input brightening agent 2624a-2624d (collectively 2624) into respective treatment tanks 2606b-2606e. In one embodiment, the brightening agents 2624 are identical. Alternatively, the brightening agents 2624 may be different (e.g., same agent with different pH levels or different agents). Also coupled to each of the fiber isolators 2614b-2614e are fiber water reducers 2618b-2618e, which output fruit fibers (not shown) to be delivered to paper mills for inclusion with wood fiber for manufacturing paper. The output fruit fibers from the different fiber water reducers 2618a-2618e may be fruit fibers that (i) have been isolated from solution with reduced water content, and (ii) have successively increasing levels of brightness. That is, the output fiber from fiber water reducer 2618a is the least bright and the output of fiber water reducer 2618e is the brightest.

Figure 27:
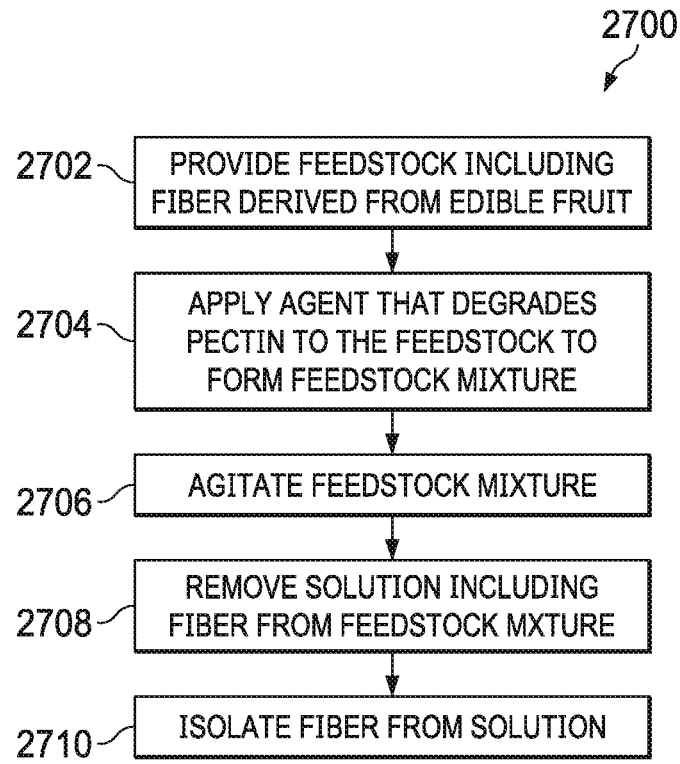
FIG. 27 is a flow diagram of an illustrative process for extracting fruit fiber from fruit by-product.

With regard to FIG. 27, a flow diagram of an illustrative process 2700 for extracting fruit fiber from fruit by-product is shown. The process 2700 may start at step 2702, where a feedstock including fiber derived from edible fruit of a plant may be provided. The edible fruit may be a citrus or non-citrus fruit, as provided hereinabove. At step 2704, an agent that degrades pectin may be applied to the feedstock to form a feedstock mixture. In applying the agent, the agent may be applied to the feedstock in one or more treatment or reaction tanks, as understood in the art. The feedstock mixture may be agitated to cause the agent to be more effective in degrading the pectin at step 2706. At step 2708, solution including the fiber from the feedstock mixture may be removed. In removing the solution, the solution may be removed from the treatment tank by using any process that leaves solid by-product in the tank while removing the solution with the fiber desired to be isolated for use in manufacturing paper. At step 2710, the fiber may be isolated from the solution. In isolating the fiber, a decanter, centrifuge, or any other mechanical or mechanical electrical device may be utilized.

Figure 28:
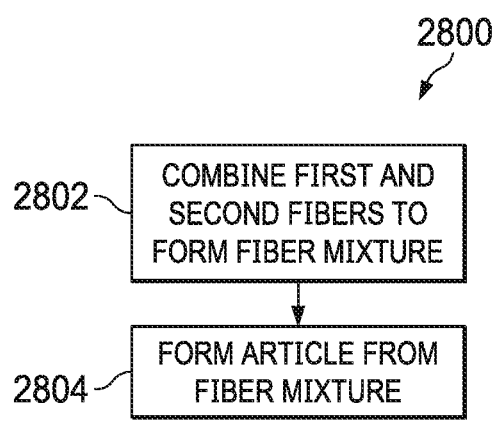
FIG. 28 is a flow diagram of an illustrative process for combining fruit fiber with wood fiber to form an article from the fiber mixture.

With regard to FIG. 28, a flow diagram of an illustrative process 2800 for combining fruit fiber with wood fiber to form an article from the fiber mixture is shown. The process 2800 may start at step 2802, where first and second fibers may be combined to form a fiber mixture. The first fiber is a wood fiber and a second fiber may be a fruit fiber, where the fruit fiber may be a combination of fruit fibers resulting from multiple degradation treatments, such as enzyme treatments, of citrus fruit. In combining the two fibers, the fibers may be combined in any manner that provides for manufacturing of paper with the two types of fibers (i.e., wood fiber and fruit fiber). In one embodiment, in combining the first and second fibers, fruit fibers that are substantially similar in shade or brightness to wood fiber may be selected and combined with the wood fiber. Such similarly shaded fruit fiber may be increased in brightness using the system and processes shown in FIG. 26, for example. At step 2804, an article may be formed from the fiber mixture. The article may be any paper article, as understood in the art.

One aspect of the present invention includes a method of isolating fiber from at least a portion of a whole citrus fruit, the method including introducing into the citrus a first enzyme to cause the at least a portion of the whole citrus fruit to partially degrade. The method may also include collecting a first eluate from the partially degraded citrus where the first eluate includes fiber. The method may further include removing the peel from the partially degraded citrus to expose first degraded citrus. In addition, the method can include applying a second enzyme to the first degraded citrus to form a second degraded citrus, then collecting a second eluate from the second degraded citrus where the second eluate includes fiber. The method may also include isolating the fiber from the first and/or second eluates. One example of a suitable enzyme for the described method may be pectinase.

The method may include increasing brightness of the isolated fiber using one or more brightening processes. The one or more brightening processes may include applying a bleaching agent to the isolated fiber at each of the one or more brightening processes. The method may additionally include creating a partially dried fiber after at least a portion of the one or more brightening processes. Creating the partially dried fiber may include creating the partially dried fiber by bed-drying, using a P-ring dryer, air drying, creating wet lap, compressing the isolated fiber, or any combination thereof.

Introducing into the citrus a first enzyme may include puncturing the peel of the citrus and introducing the first enzyme into the punctured citrus. In addition, it may include vacuum assisting the enzyme into the punctured citrus. Removing peel may include mechanically removing the peel from the citrus.

The method may also include coring the whole citrus fruit. At least a portion of the whole citrus fruit may be sweet oranges, grapefruits, mandarin, clementine, Satsuma, tangerine, Tangor, lemon, and lime.

Isolating the fiber from the first and/or second eluates may include applying a force to separate fibers of cellulose, hemicellulose, or combinations thereof. Applying a force may include using a centrifuge, decanter, agitator, fiber refiner, or any combination thereof.

Another aspect of the present invention is a system for isolating fiber from at least a portion of a whole citrus fruit, the system including a first vessel configured to introduce a first enzyme into the citrus fruit to cause the at least a portion of the whole citrus fruit to partially degrade. One example of a suitable enzyme for the described method may be pectinase. The system may further include a first collection vessel configured to collect a first eluate from the partially degraded citrus, where the first eluate includes fiber. In addition, the system may include a peel remover configured to remove peel from the partially degraded citrus to expose first degraded citrus. The system may also include a second vessel configured to apply a second enzyme to the first degraded citrus to form a second degraded citrus. Furthermore, the system may include a second collection vessel configured to collect a second eluate from the second degraded citrus, where the second eluate includes fiber. The system may additionally include a fiber isolator configured to isolate the fiber from the first and/or second eluates.

The system may include, a reactor tank configured to support a brightening agent to increase brightness of the isolated fiber, where the brightening agent may include a bleaching agent to increase brightness of the isolated fiber. Additionally, the system may include a fiber water reducer configured to partially dry the fiber after brightening the isolated fiber, where the fiber water reducer includes a bed-dryer, a P-ring dryer, an air dryer, a wet lap producer, a compressor, or any combination thereof.

The system may also include a plurality of puncturing elements configured to puncture the peel of the citrus and introducing the first enzyme into the punctured citrus fruit. In addition, the system may include a vacuum configured to reduce pressure around the citrus fruit to assist the enzyme in entering the punctured citrus fruit. The system may further include a peel remover to automatically remove the peel from the citrus fruit. Furthermore, the system may include a coring station configured to automatically core the whole citrus fruit.

At least a portion of the whole citrus fruit may be sweet oranges, grapefruits, mandarin, clementine, Satsuma, tangerine, Tangor, lemon, and lime.

In addition, the system may include a fiber isolator configured to apply a force to separate fibers of cellulose, hemicellulose, or combinations thereof from the first and/or second eluates. The fiber isolator may be a centrifuge, decanter, agitator, fiber refiner, or any combination thereof.

H. Isolating Substantially Whole Juice Sacs

Mechanical and Enzymatic Processes

One aspect of the present invention is a method of isolating substantially whole juice sacs from at least a portion of a whole citrus fruit may include introducing a first enzyme into the at least a portion of the citrus fruit to cause the at least a portion of the whole citrus fruit to partially degrade. The method may also include automatically removing a peel from the partially degraded citrus to expose a first degraded citrus. Whole juice sacs may then be isolated from the first degraded citrus.

The method may also include applying a second enzyme to the first degraded citrus to further degrade pectin in the citrus. One example of a suitable enzyme for the described method may be pectinase.

Isolating the whole juice sacs may include administering force to the first degraded citrus to cause the juice sacs to be automatically removed from citrus membranes of the first degraded citrus. Examples of administering force includes applying air or water pressure. Applying water force may include spraying the degraded citrus with water at temperatures between about 70° C. and about 90° C. Spraying the degraded citrus may include pulse spraying. In addition, the degraded citrus may be conveyed to pass across the water being sprayed. Applying air force may include, for instance, air tumbling the first degraded citrus.

Introducing enzymes into at least a portion of the citrus fruit may include puncturing the peel of the citrus and causing the enzyme to enter the peel of the punctured citrus. Introducing the enzymes may also include vacuum assisting the enzyme into the punctured citrus.

The method may also include collecting citrus oil from the punctured citrus. Removing the peel may include mechanically removing the peel from the citrus. Mechanically removing may further include scooping a citrus fruit portion from a peel portion aligned with the core of the citrus fruit portion. Mechanically removing the peel may also include scoring the peel.

In addition, the method may include coring the citrus fruit. Coring the citrus fruit may include automatically aligning the citrus fruit to cause the core of the citrus to be aligned with a coring element of a coring station. Automatically aligning the citrus may include identifying a core indicator of the citrus and automatically reorienting the citrus to cause the core of the citrus to be aligned with the coring element.

Citrus may include sweet oranges, grapefruits, mandarin, clementine, Satsuma, tangerine, Tangor, lemon, and lime.

A substantially purified population of juice sacs may be prepared by the described method. The juice sacs may be included in a beverage and consumer packaging.

A system for isolating substantially whole juice sacs from at least a portion of a whole citrus fruit may include a first vessel configured to introduce a first enzyme into the at least a portion of the citrus fruit to partial degradation of the citrus. The system may also include a peel remover configured to automatically remove peel from the partially degraded citrus to expose a first degraded citrus. The system may further include at least one isolation device configured to isolate the whole juice sacs from the first degraded citrus.

The system may additionally include a second vessel configured to apply a second enzyme to the first degraded citrus to cause the first degraded citrus to further degrade. One example of a suitable enzyme for the described method may be pectinase.

The isolation device(s) may include a conduit to apply force to the first degraded citrus to cause the juice sacs to be automatically removed from citrus membranes of the first degraded citrus. Examples of the applied force include air force or water force.

In addition, the system may include a heater configured to heat the water to a temperature between about 70° C. and about 90° C. prior to being sprayed on the first degraded citrus. A conveyer may also be included in the system, configured to pass the degraded citrus across the water being sprayed. A tumbler, to tumble the first degraded citrus, may also be included in the system.

The system may include a plurality of puncture elements configured to puncture the peel of the whole citrus fruit portion to enable the first enzyme to enter the peel. The system may also include a reduced pressure delivery system configured to assist the enzyme to enter into the punctured citrus. The system may further include a collection vessel configured to collect citrus oil from the at least a portion of the punctured whole citrus fruit. The system may additionally include a peel removal device, a scoring device configured to automatically score the peel, of the at least a portion of the whole citrus fruit, or a coring station configured to core the whole citrus fruit portion, or a combination of any of the above.

The coring station may be configured to automatically core the at least a portion of the whole citrus fruit and may further include an alignment device configured to automatically align the at least a portion of the whole citrus fruit with a coring element of the coring station. The alignment device may include at least one imaging device configured to identify a core indicator of the citrus, where the alignment device may be configured to automatically reorient the citrus to cause the core of the citrus to be aligned with the coring element of the coring station.

Reaming

Another aspect of the present invention is a method of recovering whole juice sacs from a whole citrus fruit, including automatically reaming a fruit portion of the whole citrus fruit to cause whole juice sacs to be removed from the fruit portion of the whole citrus fruit. A level of whole juice sacs recovered may be above approximately 5 percent of a total number of whole juice sacs in the fruit portion of the whole citrus fruit. The method may also include isolating the whole juice sacs from other parts of the fruit portion of the whole citrus fruit. Isolating the whole juice sacs may be performed automatically by, for example, spraying the fruit portion of the whole citrus fruit after reaming with a fluid. The fluid may be heated prior to spraying the fruit portion.

Automatically reaming may include reaming the fruit portion with a reamer device that causes greater than 5 percent of the juice sacs to be extracted and intact from the citrus fruit. A citrus fruit reamer may include a reamer body including a nose, a base, and an external surface, where the nose may be positioned on a central axis of the reamer body and the external surface may be between the nose and the base. In addition, the reamer may include a plurality of leading edges spaced circumferentially about the external surface of the reamer body where each leading edge may be extending radially between the nose and the base. Furthermore, the reamer may include a plurality of trailing edges spaced circumferentially about the external surface of the reamer body and radially inward from the leading edges where each of the trailing edges may be interposed between a pair of leading edges. The reamer may also include a plurality of extraction channels spaced circumferentially about the external surface of the reamer body where each extraction channel extending radially between the nose and the base and between respective leading and trailing edges may enable intact juice sacs of a citrus fruit to be extracted therefrom.

The external surface of the reamer body may have a convex curve extending between the nose and the base where the external surface may be adapted to engage an interior of a citrus fruit. The external surface of the reamer body may have a spherical shape. The external surface of the reamer body may be substantially concentric about the central axis of the reamer body.

In addition, the citrus fruit reamer may include an attachment device associated with the base of the reamer body that is adapted to secure the citrus fruit reamer to a rotational driver. The attachment device may be an arbor extending outward from the base of the reamer body and secured substantially concentric with the central axis of the reamer body. At least one of the plurality of leading edges of the citrus fruit reamer may carry a cutting surface.

Each of the extraction channels may have a depth extending into the external surface of the reamer body and a width defined along an external circumference of the reamer body. The width of each of the extraction channels may increase from the nose to the base of the reamer body. Furthermore, each of the leading edges may be substantially aligned on an external circumference of the reamer body. Each of the extraction channels may have a depth extending into the external surface and inside the external circumference of the reamer body.

The plurality of leading edges and the plurality of extraction channels of the citrus fruit reamer may each have a spiral or helical shape extending between the nose and the base of the reamer body in a direction of rotation of the reamer during operation. Additionally, the plurality of trailing edges may have a different shape than the respective plurality of leading edges.

I. Automatic Coring

Another aspect of the present invention includes a method for automatically coring a whole citrus fruit, the method including automatically orienting a whole citrus fruit such that a core of the whole citrus fruit is substantially aligned with a coring of a coring station. The method may also include coring the whole citrus fruit to remove citrus material within the core of the whole citrus fruit.

Automatically orienting the whole citrus fruit may include sensing the whole citrus fruit and in response to identifying the orientation of the core of the whole citrus fruit from the sensing, thereby mechanically orienting the whole citrus fruit. Sensing the whole citrus fruit may include optically sensing an outer peel of the whole citrus fruit, or using a non-visible wavelength, or a combination thereof.

The method may also include identifying two features on the peel indicative of the core extending between the two features, where sensing the whole citrus fruit may include xray sensing the whole citrus fruit, thereby enabling orientation of the core to be identified.

Automatically orienting the whole citrus fruit may include spinning the whole citrus fruit to cause the core of the whole citrus fruit to align with the coring of the coring station. Spinning the whole citrus fruit may include causing a fluid in which the whole citrus fruit resides to rotate, thereby causing the whole citrus fruit to spin and self-align.

The method may additionally include establishing a first automatic coring station in parallel with a second automatic coring station, where the first automatic coring station includes a first coring bit that is smaller in diameter than a diameter of a second coring bit of the second automatic coring station. The method may further include sorting the whole citrus fruit to be automatically cored based on physical size of the whole citrus fruit, where the physical size may be indicative of an approximate diameter of the core of the whole citrus fruit. In addition, the method may include causing the whole citrus fruit to pass to the first automatic coring station if the physical size is within a range of physical sizes indicative of the core having a diameter that approximately matches a diameter of the first coring bit of the first automatic coring station. Furthermore, the method may include causing the whole citrus fruit to pass to the second automatic coring station if the physical size is within a range of physical sizes indicative of the core having a diameter that approximately matches a diameter of the second coring bit of the second automatic coring station.

In a certain aspect, the present invention provides a system for automatically coring a whole citrus fruit, the system including an orienting device configured to automatically orient a whole citrus fruit. The system may also include a coring station configured to core the whole citrus fruit to remove citrus material within the core of the whole citrus fruit.

The system may further include a sensor configured to sense the whole citrus fruit. Also, the system may include a processing unit in communication with the sensor. The processing unit may be configured to identify the orientation of the core of the whole citrus fruit and, in response to identifying orientation of the core of the whole citrus fruit, causing the orienting device to mechanically orient the whole citrus fruit. The sensor may be configured to optically sense an outer peel of the whole citrus fruit. In addition, the sensor may be configured to use a non-visible wavelength, where the wavelength may be an xray wavelength.

The processing unit may be further configured to identify two features on the peel indicative of the core extending between the two features.

The orienting device of the system may include a rotating liquid in which the whole citrus fruit spins to cause the core of the whole citrus fruit to self-align with a coring element of the coring station. Spinning the whole citrus fruit may include a robotic arm inclusive of a gripper configured to grip and orient the whole citrus fruit.

Additionally, the system may include a first automatic coring station in parallel with a second automatic coring station. The first automatic coring station may have a coring element that is smaller in diameter than a diameter of a second coring element of the second automatic coring station.

The system may also include a fruit router configured to sort the whole citrus fruit to be automatically cored based on physical size of the whole citrus fruit, the physical size being indicative of an approximate diameter of the core of the whole citrus fruit. Furthermore, the system may include a first channel extending between said fruit router and said first automatic coring station that causes the whole citrus fruit to pass to the first automatic coring station if the physical size of the whole citrus fruit is within a range of physical sizes indicative of the core having a diameter that approximately matches a diameter of the first coring element of the first automatic coring station. Moreover, the system may include a second channel extending between said fruit router and said second automatic coring station that causes the whole citrus fruit to pass to the second automatic coring station if the physical size of the whole citrus fruit is within a range of physical sizes indicative of the core having a diameter that approximately matches a diameter of the second coring element of the second automatic coring station.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

The invention claimed is:

1. A method of isolating whole juice sacs from at least a portion of a whole citrus fruit including peel surrounding fruit segments defined by segment membranes, said method comprising:
   introducing a first enzyme into the at least a portion of the whole citrus fruit to cause the at least a portion of the whole citrus fruit to partially degrade to produce partially degraded citrus;
   removing the peel from the partially degraded citrus to expose a first degraded peeled citrus that includes the fruit segments;
   applying a second enzyme to the first degraded peeled citrus to further degrade the first degraded peeled citrus to form a second degraded citrus that at least in part has degraded the segment membranes to cause the whole juice sacs including respective sac members to be separated therefrom; and
   isolating the whole juice sacs from the second degraded citrus and from one another.

2. The method according to claim 1, wherein the first and second enzymes are a pectinase.

3. The method according to claim 1, wherein isolating includes administering force to the second degraded citrus, the whole juice sacs being removed from the segment membranes of the second degraded citrus.

4. The method according to claim 3, wherein the administering force includes applying air or water force to the second degraded citrus.

5. The method according to claim 3, wherein the administering force includes spraying the second degraded citrus with the air or water at temperature being between about 70° C. and about 90° C.

6. The method according to claim 3, wherein the administering force includes air tumbling the second degraded citrus.

7. The method according to claim 1, wherein introducing includes puncturing the peel to enable the first enzyme to enter the peel of the at least a portion of the punctured whole citrus fruit.

8. The method according to claim 7, wherein introducing includes vacuum assisting the enzyme into the punctured citrus.

9. The method according to claim 7, further comprising collecting citrus oil from the punctured citrus.

10. The method according to claim 1, wherein removing includes mechanically removing the peel from the at least a portion of the whole citrus fruit.

11. The method according to claim 10, further comprising automatically scoring the peel of the at least a portion of the whole citrus fruit.

12. The method according to claim 10, further comprising coring the at least a portion of the whole citrus fruit.

13. The method according to claim 1, further comprising automatically coring the at least a portion of the whole citrus fruit including automatically aligning the at least a portion of the whole citrus fruit with a coring element.

14. The method according to claim 1, wherein the citrus is selected from the group consisting of sweet oranges, grapefruits, mandarin, clementine, Satsuma, tangerine, Tangor, lemon, and lime.

15. The method according to claim 1 wherein the whole juice sacs are included in a beverage.

16. The method according to claim 1 wherein the whole juice sacs are included in a consumer packaging.

17. The method according to claim 1, further comprising separating segments of the first degraded peeled citrus prior to applying the second enzyme.

* * * * *